United States Patent Office 3,562,282
Patented Feb. 9, 1971

3,562,282
TRANSITION METAL COMPLEXES OF SUBSTITUTED 2 - BENZIMIDAZOLECARBAMIC ACID, ALKYL ESTERS AND THEIR PREPARATION
Hein L. Klopping, Wilmington, Del., assignor to E. I. du Pont de Nemours and Company, Wilmington, Del., a corporation of Delaware
No Drawing. Continuation-in-part of abandoned application Ser. No. 721,061, Apr. 12, 1968, which is a continuation-in-part of abandoned application Ser. No. 629,900, Apr. 11, 1967, which in turn is a continuation-in-part of application Ser. No. 548,034, May 6, 1966. This application Mar. 5, 1969, Ser. No. 804,710
Int. Cl. C07d 49/38
U.S. Cl. 260—299
13 Claims

ABSTRACT OF THE DISCLOSURE

Transition metal complexes of substituted 2-benzimidazolecarbamic acid, alkyl esters of the following formula are useful as mite ovicides and fungicides:

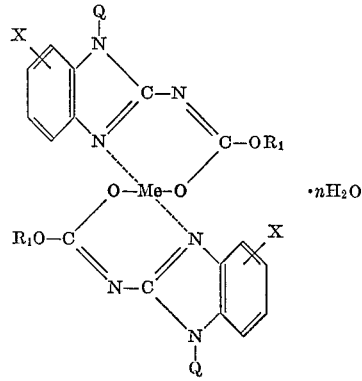

where
Q is

$-\overset{O}{\underset{\|}{C}}-NHR_2$, $COR_3$, $CDER_4$ or $SZ$ and X, $R_1$, $R_2$, $R_3$, $R_4$, Z, $n$ and Me are as defined hereinafter.

An exemplary species of the general class is the complex:
1 - (butylcarbamoyl) - 2 - benzimidazolecarbamic acid, methyl ester 2:1 manganese complex.

CROSS REFERENCE TO RELATED APPLICATIONS

This application is a continuation-in-part of my copending application Ser. No. 721,061, filed Apr. 12, 1968 now abandoned, which application is a continuation-in-part of my copending application Ser. No. 629,900 filed Apr. 11, 1967 now abandoned, which application is a continuation-in-part of my copending application Ser. No. 548,034, filed May 6, 1966.

BACKGROUND OF THE INVENTION

This invention relates to the novel complexes formed between transition metal cations and substituted 2-aminobenzimidazoles and to methods of using these complexes to prevent or mitigate damage to plants and inanimate organic materials by fungi and mites. The invention also relates to processes for preparing such complexes.

The survival of man has for a long time been dependent in a large measure upon his ability to protect from the various agents of destruction, plants and their products which satisfy his basic needs. With the rapidly increasing population of the world it becomes imperative that there be continuing great improvements in the efficiency of the materials and the methods employed to provide this protection. These improvements can be in the form of effective control of more kinds of pests or in the form of requiring less material or work. The materials and methods of this invention represent marked advances in both of these possible areas of improvement, as will be explained more fully.

I have discovered that application of the complexes of this invention by the methods of this invention, surprisingly, entirely precludes or reduces damage to plants and inanimate organic materials due to both fungi and mites. Fungus mycelia are killed or prevented from developing further by the presence of one or more of the complexes, i.e., the complexes are fungicidal or fungistatic. The complexes further prevent mite populations from expanding or reduce them to a low level or even eliminate them by preventing the normal hatching of their eggs, i.e., the complexes are mite ovicides.

The complexes and methods of this invention also make possible the control of damage by both fungi and mites with an amazingly small amount of chemical and with surprisingly little effort. These advantages are due in large measure to the fact that the complexes when properly applied, can enter and move about in plants. This means that an entire plant can be protected from mites and fungi with a simple application of the chemical to only a part of it, i.e. the complexes are systemic. Further, if the complexes are applied after a disease-causing fungus is already established within a plant, they can enter the tissues and eradicate the infection, i.e. the complexes are curative. Thus, the need for applications prior to the actual incidence of the disease is eliminated under many circumstances.

SUMMARY OF THE INVENTION

It has been found that the above outstanding fungicidal and mite ovicidal activity can be obtained by applying to the locus of mite or fungus infestation, the complexes represented by the following formula:

Formula I

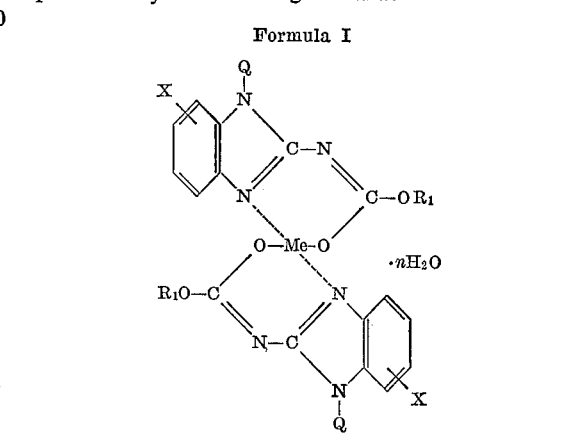

wherein
Q is

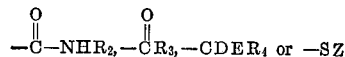

$-\overset{O}{\underset{\|}{C}}-NHR_2, -\overset{O}{\underset{\|}{C}}R_3, -CDER_4$ or $-SZ$ X is hydrogen, halogen, alkyl of 1 through 4 carbon atoms, nitro, or alkoxy of 1 through 4 carbon atoms;
$R_1$ is methyl, ethyl, isopropyl or sec-butyl;
$R_2$ is alkyl of 1 through 12 carbon atoms; alkenyl of 3 through 12 carbon atoms; alkynyl of 3 through 12 carbon atoms; cycloalkenyl of 4 through 8 carbon atoms; cycloalkyl of 3 through 8 carbon atoms; cycloalkyl of 3 through 8 carbon atoms substituted with methyl, methoxy, or chlorine; (cycloalkyl)alkyl of 7 or 8 carbon atoms; phenyl; phenyl substituted with methyl, ethyl, methoxy, ethoxy, nitro, $CF_3$, $CH_3SO_2$—, or halogen; benzyl; benzyl substituted with methyl, nitro, methoxy, or halogen; or hydrogen;

$R_3$ is hydrogen; alkyl of 1 through 12 carbon atoms; alkyl of 1 through 12 carbon atoms substituted with cyano, —$OR_1$, acetoxy, chlorine, or fluorine; alkenyl of 3 through 10 carbon atoms; alkynyl of 3 through 10 carbon atoms; cycloalkyl of 3 through 8 carbon atoms; or

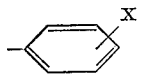

$R_4$ is alkyl of 1 through 12 carbon atoms; alkyl of 1 through 12 carbon atoms substituted with cyano, hydroxy, —$OR_1$, chlorine or bromine; alkenyl of 3 through 10 carbon atoms; alkynyl of 3 through 10 carbon atoms; cycloalkyl of 3 through 8 carbon atoms; (cycloalkyl) alkyl of 7 through 10 carbon atoms;

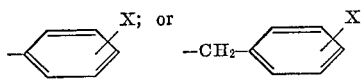

Z is alkyl of 1 through 3 carbon atoms; alkyl of 1 through 3 carbon atoms substituted with chlorine; phenyl; phenyl substituted with nitro, chlorine or methyl; benzyl; or benzyl substituted with nitro, chlorine or methyl;

D and E are oxygen or sulfur, provided that one must be sulfur;

Me is zinc, copper, nickel, manganese, cobalt, cadmium, iron or chrominum; and $n$ is 0, ½, 1, 1½, 2, or 3.

Preferred within Formula I because of their greater pesticidal activity are the compounds of the following formula:

Formula II

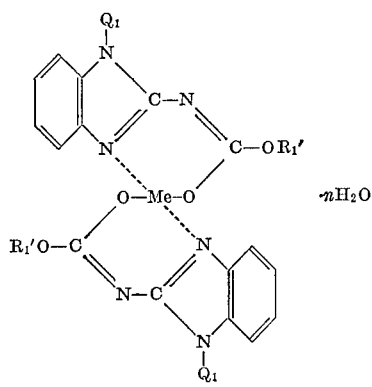

wherein
$Q_1$ is

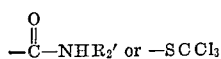

$R_1'$ is methyl or ethyl;
$R_2'$ is alkyl of 1 through 8 carbon atoms;
Me is zinc or manganese; and
$n$ is 0, 1, 1½ or 2.

Most preferred within Formula I because of their activity are the following complexes:
1-(butylcarbamoyl)-2-benzimidazolecarbamic acid, methyl ester 2:1 zinc complex and
1-(butylcarbamoyl)-2-benzimidazolecarbamic acid, methyl ester 2:1 manganese complex.

The invention is also directed to novel processes for preparing the complexes of Formula I. In these processes, the starting benzimidazolecarbamate is reacted with the appropriate metal salt in a system composed of (a) an aqueous solution of the metal salt, (b) a suitable organic solvent, and (c) the benzimidazolecarbamate which initially is present mostly in undissolved solid form in the organic solvent and (d) where necessary, an aqueous solution of a base. The system is agitated vigorously and after a suitable period of time, the product complex is separated by pouring the mixture into water followed by filtration, or by direct filtration of the reaction mixture, depending upon the type of reaction employed.

DETAILED DESCRIPTION OF THE INVENTION

The novel complexes of the invention are made by reacting a benzimidazolecarbamate with the appropriate metal salt. The benzimidazolecarbamate reactants used are of the general formula:

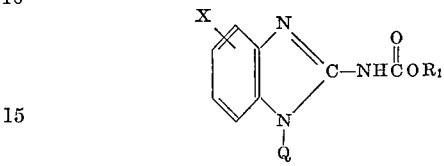

where
Q is

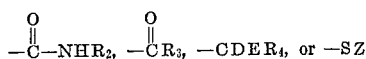

X is hydrogen, halogen, alkyl of 1 through 4 carbon atoms, nitro, or alkoxy of 1 through 4 carbon atoms;

$R_1$ is methyl, ethyl, isopropyl or sec-butyl;

$R_2$ is alkyl of 1 through 12 carbon atoms; alkenyl of 3 through 12 carbon atoms; alkynyl of 3 through 12 carbon atoms; cycloalkenyl of 4 through 8 carbon atoms; cycloalkyl of 3 through 8 carbon atoms; cycloalkyl of 3 through 8 carbon atoms substituted with methyl, methoxy, or chlorine; (cycloalkyl)-alkyl of 7 or 8 carbon atoms; phenyl; phenyl substituted with methyl, ethyl, methoxy, ethoxy, nitro, $CF_3$, $CH_3SO_2$—, or halogen; benzyl; benzyl substituted with methyl, nitro, methoxy, or halogen or hydrogen;

$R_3$ is hydrogen; alkyl of 1 through 12 carbon atoms; alkyl of 1 through 12 carbon atoms substituted with cyano, —$OR_1$, acetoxy, chlorine, or fluorine; alkenyl of 3 through 10 carbon atoms; alkynyl of 3 through 10 carbon atoms; cycloalkyl of 3 through 8 carbon atoms; or

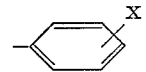

$R_4$ is alkyl of 1 through 12 carbon atoms; alkyl of 1 through 12 carbon atoms are substituted with cyano, hydroxy, —$OR_1$, chlorine or bromine; alkenyl of 3 through 10 carbon atoms; alkynyl of 3 through 10 carbon atoms; cycloalkyl of 3 through 8 carbon atoms; (cycloalkyl)alkyl of 7 through 10 carbon atoms;

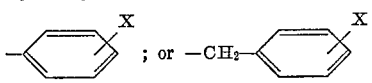

Z is alkyl of 1 through 3 carbon atoms; alkyl of 1 through 3 carbon atoms substituted with chlorine; phenyl; phenyl substituted with nitro, chlorine or methyl; benzyl; or benzyl substituted with nitro, chlorine or methyl; and D and E are oxygen or sulfur, provided that one must be sulfur.

Among the benzimidazolecarbamates, the compounds where
X is hydrogen
Q is

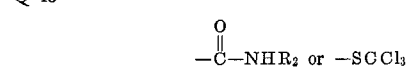

$R_1$ is methyl or ethyl; and
$R_2$ is alkyl of 1 through 8 carbon atoms are preferred in view of the high activity of the product complex.

Most preferred on the basis of highest activity of the resulting complex are the following compounds:
1-butylcarbamoyl-2-benzimidazolecarbamic acid, methyl ester 1-hexylcarbamoyl-2-benzimidazolecarbamic acid, methyl ester 1-octylcarbamoyl-2-benzimidazolecarbamic acid, methyl ester 1-(o-methoxyphenylcarbamoyl)-2-benzimidazolecarbamic acid, methyl ester 1-trichloromethylthio-2-benzimidazolecarbamic acid, methyl ester 1-trichloromethylthio-2-benzimidazolecarbamic acid, ethyl ester The benzimidazolecarbamate reactants can be prepared as described in the art, for example in Belgian Patent 698,071.

Thus, they can be prepared by reacting a 2-benzimidazolecarbamate of the formula:

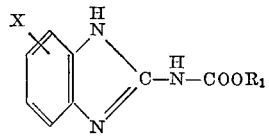

with one equivalent of an alkyl chlorothiolformate, alkyl chlorothionoformate, alkyl chlorodithioformate, isocyanate, acyl chloride or a sulfenyl chloride in an inert solvent. The 2-benzimidazolecarbamate can be prepared as taught in U.S. Pat. 3,010,768.

The transition metal salts used in preparing the metal complexes of this invention are salts of zinc, manganese, nickel, cobalt, copper, cadmium, iron and chromium. The salts may be acetates, chlorides, sulfates, nitrates, citrates and the like. Preferred for reasons of high fungicidal activity are complexes containing zinc and manganese.

In some cases, the complexes may have different structures, e.g., they may be 1:1 complexes rather than 2:1 complexes, and they may contain anions such as acetate ions if the complex was made from a metal acetate, etc. However, such complexes are usually obtained by methods other than the novel methods of this invention. For example, they may be obtained by reacting the benzimidazole derivative and the metal salt in an organic solvent such as ethyl acetate in the absence of water. The products thus obtained have the disadvantage of being unstable in the presence of water and are therefore not preferred.

The novel complexes of the present invention may be prepared either by known methods or by the novel processes of this invention. In a known preparation such as described in Example 6, the benzimidazolecarbamate derivative is dissolved in a suitable solvent such as dimethylformamide, and a molar equivalent of sodium methoxide is added in order to convert the benzimidazolecarbamate to its sodium derivative. To the solution thus obtained, one half molar equivalent of the desired metal salt is added in the form of a solution in dimethylformamide. After stirring for a suitable period, for example 15 minutes, the reaction mixture is poured into a mixture of ice and water with stirring, and the product is isolated by filtration, washing and drying.

In contrast to this known process, one of the novel processes of this invention permits slurrying rather than dissolving the benzimidazolecarbamate as well as the heavy metal salt in dimethylformamide, thus drastically reducing the amount of dimethylformamide required. Furthermore, the novel process uses concentrated aqueous sodium or potassium hydroxide or carbonate instead of the much more costly sodium methoxide, or can use tertiary (lower alkyl) amines or tetra (lower alkyl) ammonium hydroxides, and furthermore, may use the cheaper metal salts of inorganic acids, e.g. sulfates, chlorides, or nitrates, instead of the much more expensive salts of organic acids, e.g. acetic acid; see Example 10.

In different embodiments of this novel process, the dimethylformamide used as the solvent is replaced by acetone (Example 11) or methyl ethyl ketone (Example 12) and the heavy metal salt is added in the form of a highly concentrated or saturated aqueous solution. The use of methyl ethyl ketone has the advantage that the metal complex can be isolated by simple filtration without the necessity of pouring the reaction mixture into water. The methyl ethyl ketone recovered from the filtration can be used as such in preparing the next batch of metal complex. It will be clear to one skilled in the art that these processes, particularly the one employing methyl ethyl ketone, can be operated in a continuous manner.

In another novel process according to the present invention, the benzimidazolecarbamate is reacted with the metal salt in a three-phase system consisting of an aqueous solution of the metal salt, a suitable water-immiscible organic solvent such as ethyl acetate, and the benzimidazolecarbamate which is present mostly in undissolved solid form in the organic solvent. This process obviates the use of a base. The three-phase system is agitated vigorously, and after a suitable period of stirring which depends upon the reaction conditions used, the solid phase has passed from the organic phase to the aqueous phase, which signifies that the reaction is complete. This phenomenon can be checked by stopping agitation for a moment in order to allow the liquid phases to separate. The product is separated by filtration or similar means, and the two liquid phases in the filtrate can be used directly in preparing the next batch of product. It will be clear to one skilled in the art that this novel process is eminently suitable for continuous operation, e.g. in a pipe reactor.

In describing this process of this invention in greater detail, Example 1 below can be used as a starting point. In this example, an essentially saturated solution of 6 molar equivalents of zinc acetate dihydrate in water is mixed with about a 10% (by weight) slurry of one molar equivalent of 1 - (butylcarbamoyl) - 2 - benzimidazolecarbamic acid, methyl ester in ethyl acetate, at room temperature. The volumes of the two liquid phases are equal and are each about 3200 cc. per mole of the benzimidazolecarbamate. Under these conditions, assuming vigorous and efficient agitation so that the stirred reaction mixture has the appearance of an emulsion, the conversion to the metal complex is virtually instantaneous. Thus, these or similar conditions are particularly suitable for a continuous process, e.g. in a pipe reactor.

On stopping agitation, the two liquid phases separate virtually immediately. The two phases may first be separated, followed by filtration of the aqueous phase in order to obtain the product, or the three-phase system may be filtered as such without prior separation. In either case, the two-phase filtrate may be used as such for preparing the next batch of metal complexes by simply adding the required amounts of benzimidazolecarbamate and metal salt.

The conditions described in Example 1 can be varied within wide limits. For example, the amount of zinc acetate dissolved in the aqueous phase can be reduced from 6 molar equivalents to 1 molar equivalent (which is 100% excess over theoretical). At this concentration of zinc acetate, the conversion to the metal complex is not instantaneous but still very rapid. However, if the amount of zinc acetate is cut down still further, for example to 10% excess over theoretical, the other conditions remaining the same, the conversion proceeds so slowly that it is still incomplete after 6 hours of agitation with a normal laboratory stirrer. It should be noted here that the use of specially designed high-speed agitators, Waring Blendors, etc. would of course tend to reduce the period required for complete conversion.

The concentration of the zinc acetate in the aqueous phase can be below the saturated level. For example, when using 1 molar equivalent of zinc acetate, as above (100% excess), in twice the amount of water (about 6400 cc. per mole of benzimidazolecarbamate) the conversion still takes place, but the time required is 1-2 hours.

The volumes of water and ethyl acetate used may both be reduced as well as increased. However, the volumes should preferably not be reduced below the point where efficient mixing of the phases is hampered. Increasing these volumes lengthens the reaction period and generally offers no great advantages.

Water and ethyl acetate must both be present, however. As discussed above, the use of ethyl acetate alone results in the formation of a 1:1 zinc acetate complex which is unstable in water and therefore not preferred. The use of water alone, even for prolonged reaction periods, does not result in any noteworthy conversion. The ethyl acetate may be replaced by other suitable water immiscible esters and ethers (e.g. amyl acetate, diethyl ether), but the use of hydrocarbons, chlorinated hydrocarbons, etc. (e.g. benzene, hexane, chloroform) generally results in poor or slow conversions and the latter solvents are therefore not preferred. The use of water-miscible ethers such as tetrahydrofuran leads to the formation of rather intractable mixtures which, although not devoid of fungitoxicity, are not preferred.

As discussed above, ethyl acetate may also be replaced by such water-miscible or partly water-miscible solvents as dimethylformamide, acetone or methyl ethyl ketone, but in these cases the presence of a base is necessary for obtaining high yields, and the heavy metal sulfates, for example, work just as well as the acetates.

Referring now to the process of Example 1, the pH of the reaction mixture plays a part in the ease and degree of conversion as evidenced by the fact that with zinc chloride, the conversion proceeds with much less ease than with zinc acetate. It is advisable, for each benzimidazolecarbamate and for each metal salt, to determine the conditions of optimum pH and, if necessary, to adjust and maintain the pH at the optimum level.

With reference to all novel processes of this invention, it can be stated that the temperature at which the conversion is carried out can in general vary between the freezing point and the boiling point of the reaction mixture. Elevated temperatures can, for example, be advantageous in cases where the metal salt used has low water-solubility. However, the 1-substituted benzimidazolecarbamic acid esters used as starting meterials in this invention show varying degrees of thermal instability at elevated temperatures depending upon the nature of the substituent in the 1-position. Thus, in cases where this thermal instability is pronounced, it is recommended that the other reaction conditions are so chosen that the conversion requires a minimum of time, and that the temperature be kept below, say, 50° C. It is preferred to carry out the reactions at room temperature without external heating or cooling. In some cases, depending upon the solubility of the product in the organic solvent, it is of some advantage in regard to the yield to cool the reaction mixture to, say 0–3° C. before filtering.

Another factor which influences ease of reaction and yield is the particle size of the organic starting material. For example, it was found that micropulverization of the starting material can in some cases increase the yield of metal complex by as much as 15% under otherwise identical conditions.

The novel complexes of this invention as prepared by the known and novel processes discussed above are usually obtained in the form of dihydrates under ordinary drying conditions, such as for example spreading out in the air or drying in a vacuum oven at slightly elevated temperatures, e.g., up to 50° C. However, the materials may be converted to forms containing less water, for example the corresponding monohydrates, hemihydrates or even the completely anhydrous forms. The monohydrates and anhydrous forms are by far the most frequently obtained forms.

They are obtained for example by vacuum drying at more elevated temperatures, e.g. 60–100° C., or by drying in solution or suspension. These methods are illustrated in Examples 13–16. In some cases, conversion of the dihydrates to the corresponding monohydrates or anhydrous forms results not only in increased antifungal and mite ovicidal activity but also in markedly increased storage stability.

This is particularly true in the case of the 1-carbamoyl compounds of this invention. As discussed, in Examples 13–16, that drying of the dihydrates of this type to the corresponding monohydrates or anhydrous forms results in changes in the IR spectra (e.g. the appearance of a peak at 5.8μ) which, together with the increased stability, point to a structural rearrangement in the metal complex whereby the —COOR$_1$ group in the 2-position no longer participates directly in the bonding of the metal atoms and this bonding function is taken over by the carbamoyl group in the 1-position. Thus, it should be kept in mind that the appropriate compounds of Formula I or II in which $n=0$, ½ or 1 may have structures such as:

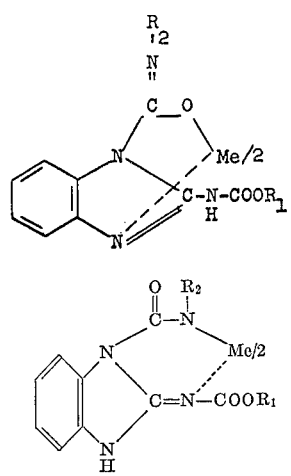

etc.

However, for purposes of convenience we shall continue to refer to the compounds of this invention as compounds of Formula I or II.

The following examples illustrate the preparation of the compounds of Formula I. The amounts given are in parts by weight unless otherwise specified. In some of the examples both parts (by weight) and parts by volume are mentioned; in these cases, the units of measure correspond in the form of: grams to milliliters, kilograms to liters, etc.

Example 1.—Preparation of 1-(butylcarbamoyl)-2-benzimidazolecarbamic acid, methyl ester 2:1 zinc complex, dihydrate To a virtually saturated solution of 66 parts of zinc acetate dihydrate in 160 parts of water is added 14.5 parts of 1 - (butylcarbamoyl)-2-benzimidazolecarbamic acid, methyl ester and 144 parts (160 parts by volume) of ethyl acetate. This mixture contains 6 moles of zinc acetate dihydrate per mole of organic starting material. It is a three-phase system in which the solid organic starting material is present in the ethyl acetate layer in mostly undissolved form. The mixture is agitated vigorously at room temperature. After a few minutes, the stirrer is stopped and the mixture is allowed to separate into its phases. It is observed that the solid material is now present in the aqueous layer, signifying that the conversion is complete. Under the conditions of this example, the conversion is virtually instantaneous. The reaction mixture is cooled to 0–5° C. in order to increase the yield, filtered, and the solid is washed with cold ethyl acetate and cold water, and dried. The product weighs 15.3 parts (90%). The ethyl acetate layer is found to contain, on evaporation, 1 part of organic starting material, so that the yield is 97% based on the starting material converted.

The IR spectrum shows the following characteristic changes as compared with the IR spectrum of the organic starting material: the characteristic peaks shown by the parent compound at about 5.8 and 8.8μ have disappeared, and new peaks have appeared at about 6.0, 6.6 and 8.7μ.

NMR spectrum.—The product has a triplet at −.88τ with a coupling constant $J=5.1$ cps. This absorption is due to the proton attached to N in the 1-butylcarbamoyl group. This same triplet is present in the parent compound and occurs at −.45τ with a coupling constant of $J=5.1$ cps.

The presence in the product of the essentially unchanged absorption of the proton attached to N in the 1-butylcarbamoyl group constitutes strong evidence for the lack of involvement of the butylcarbamoyl moiety of the molecule with the metal atom.

The spectrum of the parent compound shows absorption at −2.28τ (broad) assigned to the proton attached to nitrogen in the 2-position. In the product, this peak is no longer present, indicating that this proton has been replaced by the metal.

Rapid exchange of the two protons discussed above is hindered in deuterodimethylsulfoxide (used as the solvent), thus allowing observation of their separate absorption positions and, where applicable, their coupling constants.

There is no other absorption below 1.5τ in either the product or the parent compound. Changes in the absorption patterns of the aromatic hydrogens support the assignment of the association of the 3-nitrogen with the metal.

Elemental analysis.—Calc. for $C_{28}H_{38}N_8O_8Zn$ (percent): C, 49.5; H, 5.6; N, 16.5; Zn, 9.6. Found (percent): C, 49.50; H, 5.61; N, 16.42; Zn, 9.59.

Melting point.—As is to be expected from a compound of this type, the product melts over a very broad range.

Dehydration.—As described in more detail in one of the following examples, the product loses two molecules of water upon heating in a vacuum oven at 60–65° C.

Structural formula.—The above information is consistent with the following structural formula:

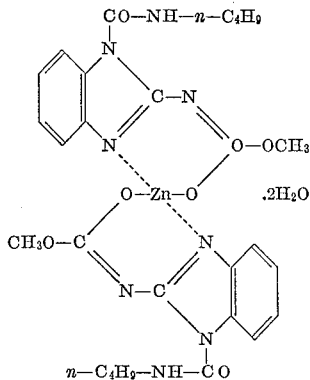

Example 2.—Preparation of 1-(butylcarbamoyl)-2-benzimidazolecarbamic acid, methyl ester 2:1 manganese complex, dihydrate To a solution of 74 parts of manganese acetate tetrahydrate in 220 parts of water is added 14.5 parts of 1-(butylcarbamoyl)-2-benzimidazolecarbamic acid, methyl ester and 171 parts (190 parts by volume) of ethyl acetate. The mixture is agitated vigorously at room temperature for two hours, and is then filtered. The solid is washed with ethyl acetate and water, and dried. Spectral and elemental analyses of the type discussed in Example 1 show that under the conditions used, the conversion is not complete, and that the material obtained is a mixture of about 55% manganese 2:1 complex, dihydrate and about 45% parent compound. The parent compound is removed by slurrying the material with chloroform, filtering and washing with chloroform. The insoluble solid consists of the desired complex.

The IR spectrum shows the absence of peaks at 5.8 and 8.8μ which are characteristic for the starting material, and the presence of peaks at 6.0, 6.6 and 0.7μ which are characteristic for the desired manganese 2:1 complex, dihydrate.

Elemental analysis.—Calc. for $C_{28}H_{38}N_8O_8Mn$ (percent): C, 50.25; H, 5.7; N, 16.8. Found (percent): C, 50.47; H, 5.75; N, 16.75.

The structural formula of this material is as shown in Example 1 with the difference that a manganese atom replaces the zinc atom.

Example 3.—Preparation of 1-(butylcarbamoyl)-2-benzimidazolecarbamic acid, methyl ester 2:1 copper complex To a solution of 60 parts of cupric acetate dihydrate in 850 parts of water is added 29 parts of 1-(butylcarbamoyl)-2-benzimidazolecarbamic acid, methyl ester and 405 parts (450 parts by volume) of ethyl acetate. The mixture is stirred vigorously for 3½ hours at room temperature; it is then filtered. The solid is washed with ethyl acetate and water, and dried. It consists of a light green powder and weighs 28 parts. The IR spectrum shows characteristic peaks at 5.95, 6.5 and 8.7μ. There are no peaks at 5.8 and 8.8μ.

Elemental analysis.—Calc. for $C_{28}H_{34}N_8O_6Cu$ (percent): C, 52.45; H, 5.4; N, 17.5. Found (percent): C, 52.49; H, 5.47; N, 17.33.

Example 4.—Preparation of 1-(butylcarbamoyl)-2-benzimidazolecarbamic acid, methyl ester 2:1 nickel complex, trihydrate To a solution of 75 parts of nickel acetate tetrahydrate in 220 parts of water is added 14.5 parts of 1-(butylcarbamoyl)-2-benzimidazolecarbamic acid, methyl ester and 171 parts of ethyl acetate. The mixture is stirred vigorously at room temperature for 2 hours. It is then filtered, and the solid is washed with ethyl acetate, water and acetone, and dried. It weighs 11 parts.

The infrared spectrum indicates the presence of a small amount of parent material and furthermore clearly shows the characteristic peaks of the desired product at 6.0, 6.6 and 8.7μ. The product is a light greenish-blue powder.

Elemental analysis.—Calc. for a 9:1 mixture of product and parent material (percent): C, 49.63; H, 5.84; N, 16.51. Found (percent): C, 49.69; H, 5.80; N, 16.06.

Example 5.—Preparation of 1-(butylcarbamoyl)-2-benzimidazolecarbamic acid, methyl ester 2:1 cobalt complex, dihydrate To a solution of 75 parts of cobalt acetate tetrahydrate in 220 parts of water is added 14.5 parts of 1-(butylcarbamoyl)-2-benzimidazolecarbamic acid, methyl ester and 171 parts of ethyl acetate. The mixture is stirred vigorously at room temperature for 2 hours. It is then filtered, washed with ethyl acetate, water and acetone, and dried. The light pink powder weighs 16 parts. The infrared spectrum shows characteristic peaks at 6.0, 6.6 and 8.7μ. It also indicates the presence of a small amount of starting material.

Elemental analysis.—Calc. for a 9:1 mixture of product and parent material (percent): C, 50.80; H, 5.76; N, 16.87; Co, 7.87. Found (percent): C, 50.89; H, 5.87; N, 16.62; Co, 7.56.

Example 6.—Preparation of the manganese complex of Example 2 by a known method

Twenty-nine parts (1 molar equivalent) of 1-(butylcarbamoyl) - 2 - benzimidazolecarbamic acid, methyl ester is added to 19 parts of dimethylformamide. The mixture is stirred while 5.4 parts (1 molar equivalent) of sodium methoxide is added. The organic material dissolves. Then, a solution of 12.2 parts (0.5 molar equivalent) of manganese acetate tetrahydrate in 50 parts of dimethylformamide (dissolved by slight warming, is added while stirring at room temperature. After stirring for an additional 15-minute period, the mixture is poured into 3000 parts of ice and water, while stirring. After stirring for another 30 minutes, the mixture is filtered, washed with water and dried. The product is identical in all respects with the product of Example 2.

Example 7.—Preparation of the product of Example 1 in diethylether and water

The preparation of Example 1 is repeated with this difference that the 160 parts by volume of ethyl acetate is replaced by an equal volume of diethyl ether.

The reaction proceeds in essentially the same manner, and the product is identical in all respects with that of Example 1.

Example 8.—Preparation of the product of Example 1 in amyl acetate and water

The preparation of Example 1 is repeated with this difference that the 160 parts by volume of ethyl acetate is replaced by an equal volume of n-amyl acetate. The reaction proceeds in essentially the same manner, and the product is identical in all respects with that of Example 1.

Example 9

Using the method of Example 1, the organic materials listed in the following table are reacted with zinc acetate in water-ethyl acetate in the same molar quantities as in Example 1 to give the products litsed.

A slurry of 5.8 parts of 1-(butylcarbamoyl)-2-benzimidazolecarbamic acid, methyl ester in 100 parts by volume of acetone is stirred vigorously, and 1.6 parts of 50% aqueous sodium hydroxide is added dropwise. Stirring is continued for 1 hour. To the acetone suspension of the sodium derivative of 1 - butylcarbamoyl)-2-benzimidazolecarbamic acid, methy ester thus obtained is added dropwise with stirring a solution of 1.7 parts of manganese sulfate monohydrate in 4 parts of water.

Large drops of the aqueous phase are visible in the acetone phase after completion of the addition. Stirring is continued for three hours. Thus, the mixture is poured into 250 parts of water with stirring. After stirring for 15 minutes, the suspension is filtered, and the solid is washed and dried. The product, which weighs 6.2 parts, is identical in all respects with that of Example 2.

Example 12.—Preparation of the product of Example 2 in methyl ethyl ketone and water in the presence of a base A slurry of 5.8 parts of 1-(butylcarbamoyl)-2-benzimidazolecarbamic acid, methyl ester in 50 parts by volume of methyl ethyl ketone is stirred vigorously, and 1.6 parts of 50% aqueous sodium hydroxide is added dropwise. Stirring is continued for 1 hour. To the suspension in methyl ethyl ketone of the sodium derivative

TABLE

| Starting material | Product | Infrared spectrum, Characteristic peaks at— |
|---|---|---|
| 1-(n-hexylcarbamoyl)-2-benzimidazolecarbamic acid, methyl ester | 1-(n-hexylcarbamoyl)-2-benzimidazolecarbamic acid, methyl ester 2:1 zinc complex, monohydrate. | 5.96, 6.55 and 8.7 $\mu$. |
| 1-(n-octylcarbamoyl)-2-benzimidazolecarbamic acid, methyl ester | 1-(n-octylcarbamoyl)-2-benzimidazolecarbamic acid, methyl ester 2:1 zinc complex, dihydrate. | 5.93, 6.53 and 8.7 $\mu$. |
| 1-($\Delta^9$-decenylcarbamoyl)-2-benzimidazolecarbamic acid, methyl ester | 1-($\Delta^9$-decenylcarbamoyl)-2-benzimidazolecarbamic acid, methyl ester 2:1 zinc complex, dihydrate. | 5.96, 6.55 and 8.72 $\mu$. |
| 1-(allylcarbamoyl)-2-benzimidazolecarbamic acid, methyl ester | 1-(allylcarbamoyl)-2-benzimidazolecarbamic acid, methyl ester 2:1 zinc complex, dihydrate. | 6.0, 6.5 and 8.63 $\mu$. |
| 1-(methylcarbamoyl)-2-benzimidazolecarbamic acid, methyl ester | 1-(methylcarbamoyl)-2-benzimidazolecarbamic acid, methyl ester 2:1 zinc complex, sesquihydrate. | 5.92, 6.5 and 8.7 $\mu$. |
| 1-(cyclohexylcarbamoyl)-2-benzimidazolecarbamic acid, methyl ester | 1-(cyclohexylcarbamoyl)-2-benzimidazolecarbamic acid, methyl ester 2:1 zinc complex, dihydrate. | 5.95, 6.5 and 8.7 $\mu$. |
| 1-(benzylcarbamoyl)-2-benzimidazolecarbamic acid, methyl ester | 1-(benzylcarbamoyl)-2-benzimidazolecarbamic acid, methyl ester 2:1 zinc complex, sesquihydrate. | 5.92, 6.5 and 8.7 $\mu$. |
| 1-(p-methoxybenzylcarbamoyl)-2-benzimidazolecarbamic acid, methyl ester | 1-(p-methoxybenzylcarbamoyl)-2-benzimidazolecarbamic acid, methyl ester 2:1 zinc complex, dihydrate. | 5.98, 6.57 and 8.7 $\mu$. |
| 1-(p-methoxyphenylcarbamoyl)-2-benzimidazolecarbamic acid, methyl ester | 1-(p-methoxyphenylcarbamoyl)-2-benzimidazolecarbamic acid, methyl ester 2:1 zinc complex, dihydrate. | 5.95, 6.6 and 8.8 $\mu$. |
| 1-(trichloromethylthio)-2-benzimidazolecarbamic acid, methyl ester | 1-(trichloromethylthio)-2-benzimidazolecarbamic acid, methyl ester 2:1 zinc complex, dihydrate. | 6.46 $\mu$.[1] |
| 1-(methylthiocarbonyl)-2-benzimidazolecarbamic acid, metyl ester | 1-(methylthiocarbonyl)-2-benzimidazolecarbamic acid, methyl ester 2:1 zinc complex, monohydrate. | 6.45, 6.6 and 8.6 $\mu$. |
| 1-(methylcarbamoyl)-2-benzimidazolecarbamic acid, isopropyl ester | 1-(methylcarbamoyl)-2-benzimidazolecarbamic acid, isopropyl ester 2:1 zinc complex, dihydrate. | 5.92, 6.55 and 8.7 $\mu$. |

[1] New peak.

Example 10.—Preparation of the product of Example 2 in dimethylformamide and water in the presence of a base A slurry of 5.8 parts of 1-(butylcarbamoyl)-2-benzimidazolecarbamic acid, methyl ester and 1.7 parts of manganese sulfate monohydrate in 34 parts by volume of dimethylformamide is stirred, and 1.6 parts of 50% aqueous sodium hydroxide is added dropwise. After stirring for 1 hour, the mixture is poured with stirring into 200 parts by volume of a mixture of ice and water. The mixture is stirred for 15 minutes and filtered. The solid is washed with water and dried. The product, which weighs 6.5 parts, is identical in all respects with the product of Example 2.

Example 11.—Preparation of the product of Example 2 in acetone and water in the presence of a base of 1-(butylcarbamoyl) - 2 - benzimidazolecarbamic acid, methyl ester thus obtained is added, with stirring, a solution of 1.7 parts by weight of manganese sulfate monohydrate in three parts of water. The two liquid phases (containing the third, solid phase) are clearly visible. Stirring is continued for three hours. Then, the mixture is cooled in ice while stirring and filtered. The solid is washed with methyl ethyl ketone and water, and dried. The product, which weighs 6.2 parts, is identical in all respects with the product of Example 2.

Example 13.—Preparation of 1-(butylcarbamoyl)-2-benzimidazolecarbamic acid, methyl ester 2:1 zinc complex, monohydrate Ten parts of the dihydrate of Example 1 are mixed with 50 parts by volume of concentrated aqueous ammonia, and the mixture is stirred for two hours. The mixture is filtered, and the solid is dried. It weighs 9 parts and analyzes as follows:

Calc. for the 2:1 zinc complex, monohydrate $$C_{28}H_{36}N_8O_7Zn$$

(percent): C, 50.8; H, 5.5; N, 16.95; Zn, 9.85. Found (percent): C, 50.41; H, 5.34; N, 17.74; Zn, 9.96.

The infrared spectrum of the monohydrate product differs from that of the dihydrate mainly in that it possesses a peak at $5.8\mu$ and in that the peak at $2.9\mu$ ($H_2O$) is absent. Also, the monohydrate lacks a peak at $6.0\mu$. The monohydrate upon treatment with water reverts back to the dihydrate.

Example 14.—Preparation of 1-(butylcarbamoyl)-2-benzimidazolecarbamic acid, methyl ester 2:1 zinc complex (anhydrous form)

Ten parts of the dihydrate of Example 1 are placed in a rotary laboratory evaporator under a high vacuum (0.25 mm./Hg). The temperature is gradually increased to 60° C. and kept at that level for 1 hour. The anhydrous product obtained weighs 9 parts and analyzes as follows:

Calc. for the anhydrous 2:1 zinc complex $$C_{28}H_{34}N_8O_6Zn$$

(percent): C, 52.3; H, 5.3; N, 17.4. Found (percent): C, 52.25; H, 5.10; N, 17.34.

The infrared spectrum of the anhydrous product differs from that of the dihydrate mainly in that the peak at $2.9\mu$ is attributable to water has disappeared, and in that a new peak is present at $5.8\mu$. The anhydrous material upon treatment with water reverts back to the dihydrate.

Example 15.—Preparation of 1-(butylcarbamoyl)-2-benzimidazolecarbamic acid, methyl ester 2:1 manganese complex, monohydrate Ten parts of the dihydrate of Example 2 are placed in a rotary laboratory evaporator under a high vacuum (0.25 mm./Hg). The temperature is gradually increased to 60° C. and kept at that level for 3 hours. The monohydrate obtained weighs 9 parts and analyzes as follows:

Calc. for the 2:1 manganese complex, monohydrate $C_{28}H_{36}N_8O_7Mn$ (percent): C, 61.5; H, 5.6; N, 17.2. Found (percent): C, 51.83; H, 5.73; N, 17.12.

The infrared spectrum of the monohydrate product differs from that of the dihydrate mainly in that it contains a new peak at $5.8\mu$ and that the peak at $2.9\mu$ attributable to water has disappeared completely, even though the molecule still contains one mole of water. Upon treatment with water, the monohydrate reverts back to the dihydrate.

Example 16.—Preparation of 1 - (butylcarbamoyl) - 2-benzimidazolecarbamic acid, methyl ester 2:1 manganese complex (anhydrous form)

Ten parts of the dihydrate of Example 2 and 5 parts of Linde Molecular Sieve Type 3A are added to 50 parts by volume of dimethylformamide. The mixture is stirred for 1½ hours and filtered. The filtrate is placed in a rotary laboratory evaporator and concentrated in a high vacuum (0.25 mm./Hg) at 50° C. After removal of most of the dimethylformamide, the temperature is increased to 70° C., and drying is continued until the residue is a dry powder. The product, which weighs 9 parts, analyzes as follows:

Calc. for the anhydrous 2:1 manganese complex $C_{28}H_{34}N_8O_6Mn$ (percent): C, 53.1; H, 5.4; N, 17.7. Found (percent): C, 52.90; H, 5.72; N, 17.81.

If this drying experiment is repeated in the absence of Linde Molecular Sieve, the same product is obtained. In other words, treatment of the dihydrate with dimethylformamide and removal of this solvent by evaporation in vacuum at elevated temperature is sufficient to remove the two moles of water of hydration. However, the presence of drying agent is advantageous in that it produces a dry dimethylformamide distillate which can be used as such for drying the next batch of material. The infrared spectrum of this anhydrous material resembles that of the monohydrate of Example 15 in that both spectra (unlike that of the dihydrate of Example 2) have a peak at $5.8\mu$ and no peak at $2.9\mu$ ($H_2O$). The spectrum of the anhydrous product has an extra peak at $5.95\mu$. Upon treatment with water, the anhydrous material is converted back to the dihydrate.

Example 17

The following zinc complexes can be prepared similarly by substituting the corresponding 2-benzimidazolecarbamic acid, alkyl ester reactants for 1-(butylcarbamoyl)-2-benzimidazolecarbamic acid, methyl ester of Example 1.

1-dodecylcarbamoyl-2-benzimidazolecarbamic acid, methyl ester 2:1 zinc complex, dihydrate 1-(Δ-dodecenylcarbamoyl)-2-benzimidazolecarbamic acid, methyl ester 2:1 zinc complex, dihydrate 1-(propynylcarbamoyl)-2-benzimidazolecarbamic acid, methyl ester 2:1 zinc complex, dihydrate 1-(dodecynylcarbamoyl)-2-benzimidazolecarbamic acid, ethyl ester 2:1 zinc complex, dihydrate 1-(cyclopropylcarbamoyl)-2-benzimidazolecarbamic acid, sec-butyl ester 2:1 zinc complex, dihydrate 1-(cyclooctylcarbamoyl)-2-benzimidazolecarbamic acid, methyl ester 2:1 zinc complex, dihydrate 1-(p-methylcyclohexylcarbamoyl)-2-benzimidazolecarbamic acid, isopropyl ester 2:1 zinc complex, dihydrate 1-(cyclohexylmethylcarbamoyl)-2-benzimidazolecarbamic acid, methyl ester 2:1 zinc complex, dihydrate 1-(m-methoxycyclohexylcarbamoyl)-2-benzimidazolecarbamic acid, methyl ester 2:1 zinc complex, dihydrate 1-(p-chlorocyclohexylcarbamoyl)-2-benzimidazolecarbamic acid, methyl ester 2:1 zinc complex, dihydrate 1-(2-cyclopentenylcarbamoyl)-2-benzimidazolecarbamic acid, methyl ester 2:1 zinc complex, dihydrate 1-(2-cyclohexenylcarbamoyl)-2-benzimidazolecarbamic acid, methyl ester 2:1 zinc complex, dihydrate 1-(2-cyclooctenylcarbamoyl)-2-benzimidazolecarbamic acid, sec-butyl ester 2:1 zinc, dihydrate 1-(2-cyclobutenylcarbamoyl)-2-benzimidazolecarbamic acid, methyl ester 2:1 zinc complex, dihydrate 1-(norbornylmethylcarbamoyl)-2-benzimidazolecarbamic acid, methyl ester 2:1 zinc complex, dihydrate 1-(cyclohexylethylcarbamoyl)-2-benzimidazolecarbamic acid, methyl ester 2:1 zinc complex, dihydrate 1-(phenylcarbamoyl)-2-benzimidazolecarbamic acid, methyl ester 2:1 zinc complex, dihydrate 1-(butylcarbamoyl)-4-methyl-2-benzimidazolecarbamic acid, methyl ester 2:1 zinc complex, dihydrate 1-(butylcarbamoyl)-5-butyl-2-benzimidazolecarbamic acid, ethyl ester 2:1 zinc complex, dihydrate 1-(m-tolylcarbamoyl)-4-bromo-2-benzimidazolecarbamic acid, methyl ester 2:1 zinc complex, dihydrate 1-(p-tolylcarbamoyl)-2-benzimidazolecarbamic acid, methyl ester 2:1 zinc complex, dihydrate 1-(p-ethylphenylcarbamoyl)-5-chloro-2-benzimidazolecarbamic acid, methyl ester 2:1 zinc complex, dihydrate 1-(butylcarbamoyl)-5-fluoro-2-benzimidazolecarbamic acid, methyl ester 2:1 zinc complex, dihydrate 1-(butylcarbamoyl)-4-fluoro-2-benzimidazolecarbamic acid, methyl ester 2:1 zinc complex, dihydrate 1-(octylcarbamoyl)-4-nitro-2-benzimidazolecarbamic acid, methyl ester 2:1 zinc complex, dihydrate 1-(ethylcarbamoyl)-4-methoxy-2-benzimidazolecarbamic acid, methyl estre 2:1 zinc complex, dihydrate 1-(allylcarbamoyl)-5-butoxy-2-benzimidazolecarbamic acid, isopropyl ester 2:1 zinc complex, dihydrate 1-(p-methoxyphenylcarbamoyl)-2-benzimidazolecarbamic acid, methyl ester 2:1 zinc complex, dihydrate 1-(p-ethoxyphenylcarbamoyl)-2-benzimidazolecarbamic acid, methyl ester 2:1 zinc complex, dihydrate 1-(p-nitrophenylcarbamoyl)-2-benzimidazolecarbamic acid, methyl ester 2:1 zinc complex, dihydrate
1-(m-trifluoromethylphenylcarbamoyl)-2-benzimidazolecarbamic acid, ethyl ester 2:1 zinc complex, dihydrate
1-(p-methylsulfonylphenylcarbamoyl)-2-benzimidazolecarbamic acid, isopropyl ester 2:1 zinc complex, dihydrate
1-(p-chlorophenylcarbamoyl)-2-benzimidazolecarbamic acid, methyl ester 2:1 zinc complex, dihydrate
1-(3,4-dichlorophenylcarbamoyl)-2-benzimidazolecarbamic acid, methyl ester 2:1 zinc complex, dihydrate
1-(m-bromophenylcarbamoyl)-2-benzimidazolecarbamic acid, methyl ester 2:1 zinc complex, dihydrate
1-(o-fluorophenylcarbamoyl)-2-benzimidazolecarbamic acid, methyl ester 2:1 zinc complex, dihydrate
1-(benzylcarbamoyl)-2-benzimidazolecarbamic acid, methyl ester 2:1 zinc complex, dihydrate
1-(benzylcarbamoyl)-5-nitro-2-benzimidazolecarbamic acid, isopropyl ester 2:1 zinc complex, dihydrate
1-(o-methylbenzylcarbamoyl)-2-benzimidazolecarbamic acid, methyl ester 2:1 zinc complex, dihydrate
1-(p-methylbenzylcarbamoyl)-2-benzimidazolecarbamic acid, methyl ester 2:1 zinc complex, dihydrate
1-(p-nitrobenzylcarbamoyl)-2-benzimidazolecarbamic acid, methyl ester 2:1 zinc complex, dihydrate
1-(p-methoxybenzylcarbamoyl)-2-benzimidazolecarbamic acid, methyl ester 2:1 zinc complex, dihydrate
1-(o-fluorobenzylcarbamoyl)-2-benzimidazolecarbamic acid, methyl ester 2:1 zinc complex, dihydrate
1-(p-chlorobenzylcarbamoyl)-2-benzimidazolecarbamic acid, methyl ester 2:1 zinc complex, dihydrate
1-(m-bromobenzylcarbamoyl)-2-benzimidazolecarbamic acid, methyl ester 2:1 zinc complex, dihydrate
1-(carbamoyl)-2-benzimidazolecarbamic acid, methyl ester 2:1 zinc complex, dihydrate
1-(formyl)-2-benzimidazolecarbamic acid, methyl ester 2:1 zinc complex, dihydrate
1-(acetyl)-2-benzimidazolecarbamic acid, methyl ester 2:1 zinc complex, dihydrate
1-(propionyl)-2-benzimidazolecarbamic acid, methyl ester 2:1 zinc complex, dihydrate
1-(dodecanoyl)-2-benzimidazolecarbamic acid, methyl ester 2:1 zinc complex, dihydrate
1-(cyanoacetyl)-2-benzimidazolecarbamic acid, sec-butyl ester 2:1 zinc complex, dihydrate
1-(3-methoxypropionyl)-5-nitro-2-benzimidazolecarbamic acid, methyl ester 2:1 zinc complex, dihydrate
1-(3-sec-butoxypropionyl)-2-benzimidazolecarbamic acid, methyl ester 2:1 zinc complex, dihydrate
1-(acetoacetyl)-2-benzimidazolecarbamic acid, methyl ester 2:1 zinc complex, dihydrate
1-(levulinyl)-2-benzimidazolecarbamic acid, methyl ester 2:1 zinc complex, dihydrate
1-(4-chlorocaproyl)-2-benzimidazolecarbamic acid, methyl ester 2:1 zinc complex, dihydrate
1-(trifluoroacetyl)-2-benzimidazolecarbamic acid, methyl ester 2:1 zinc complex, dihydrate
1-(acroyl)-2-benzimidazolecarbamic acid, ethyl ester 2:1 zinc complex, dihydrate
1-(Δ⁹-decenoyl)-2-benzimidazolecarbamic acid, isopropyl ester 2:1 zinc complex, dihydrate
1-(cyclopropylcarbonyl)-2-benzimidazolecarbamic acid, methyl ester 2:1 zinc complex, dihydrate
1-(cyclooctylcarbonyl)-2-benzimidazolecarbamic acid, methyl ester 2:1 zinc complex, dihydrate
1-(propargyl)-2-benzimidazolecarbamic acid, isopropyl ester 2:1 zinc complex, dihydrate
1-(benzoyl)-2-benzimidazolecarbamic acid, methyl ester 2:1 zinc complex, dihydrate
1-(p-chlorobenzoyl)-2-benzimidazolecarbamic acid, methyl ester 2:1 zinc complex, dihydrate
1-(m-bromobenzoyl)-2-benzimidazolecarbamic acid, methyl ester 2:1 zinc complex, dihydrate
1-(p-fluorobenzoyl)-2-benzimidazolecarbamic acid, methyl ester 2:1 zinc complex, dihydrate
1-(p-methylbenzoyl)-2-benzimidazolecarbamic acid, methyl ester 2:1 zinc complex, dihydrate
1-(p-sec-butylbenzoyl)-2-benzimidazolecarbamic acid, methyl ester 2:1 zinc complex, dihydrate
1-(m-nitrobenzoyl)-2-benzimidazolecarbamic acid, methyl ester 2:1 zinc complex, dihydrate
1-(p-methoxybenzoyl)-2-benzimidazolecarbamic acid, methyl ester 2:1 zinc complex, dihydrate
1-(p-butoxybenzoyl)-2-benzimidazolecarbamic acid, methyl ester 2:1 zinc complex, dihydrate
1-(methylthio)carbonyl-2-benzimidazolecarbamic acid, methyl ester 2:1 zinc complex, dihydrate
1-(dodecylthio)carbonyl-2-benzimidazolecarbamic acid, methyl ester 2:1 zinc complex, dihydrate
1-(2-cyanoethyloxy)thiocarbonyl-2-benzimidazolecarbamic acid, methyl ester 2:1 zinc complex, dihydrate
1-(2-hydroxyethyloxy)thiocarbonyl-2-benzimidazolecarbamic acid, methyl ester 2:1 zinc complex, dihydrate
1-(3-methoxypropyloxy)thiocarbonyl-2-benzimidazolecarbamic acid, methyl ester 2:1 zinc complex, dihydrate
1-(3-sec-butoxypropyloxy)thiocarbonyl-2-benzimidazolecarbamic acid, ethyl ester 2:1 zinc complex, dihydrate
1-(2-chloroethyloxy)thiocarbonyl-2-benzimidazolecarbamic acid, methyl ester 2:1 zinc complex, dihydrate
1-(3-bromopropyloxy)thiocarbonyl-2-benzimidazolecarbamic acid, methyl ester 2:1 zinc complex, dihydrate
1-(allylthio)carbonyl-2-benzimidazolecarbamic acid, methyl ester 2:1 zinc complex, dihydrate
1-(2-butenylthio)carbonyl-2-benzimidazolecarbamic acid, methyl ester 2:1 zinc complex, dihydrate
1-(α-decenyloxy)thiocarbonyl-2-benzimidazolecarbamic acid, methyl ester 2:1 zinc complex, dihydrate
1-(cyclopropylthio)carbonyl-2-benzimidazolecarbamic acid, methyl ester 2:1 zinc complex, dihydrate
2-(methoxycarbonylamino)-1-dithiobenzimidazolecarboxylic acid, methyl ester 2:1 zinc complex, dihydrate
2-(methoxycarbonylamino)-1-thionobenzimidazolecarboxylic acid, (3-decyn-1-yl) ester 2:1 zinc complex, dihydrate
2-(methoxycarbonylamino)-1-thionobenzimidazolecarboxylic acid, cyclooctyl ester 2:1 zinc complex, dihydrate
2-(methoxycarbonylamino)-1-thionobenzimidazolecarboxylic acid, cyclohexyl methyl ester 2:1 zinc complex, dihydrate
2-(methoxycarbonylamino)-1-dithiobenzimidazolecarboxylic acid, norbornyl methyl ester 2:1 zinc complex, dihydrate
2-(methoxycarbonylamino)-1-thionobenzimidazolecarboxylic acid, cyclooctyl methyl ester 2:1 zinc complex, dihydrate
2-(ethoxycarbonylamino)-1-thionobenzimidazolecarboxylic acid, propargyl ester 2:1 zinc complex, dihydrate
1-(phenylthio)carbonyl-2-benzimidazolecarbamic acid, methyl ester 2:1 zinc complex, dihydrate
2-(methoxycarbonylamino)-1-thionobenzimidazolecarboxylic acid, phenyl ester 2:1 zinc complex, dihydrate
1-(benzylthio)carbonyl-2-benzimidazolecarbamic acid, isopropyl ester 2:1 zinc complex, dihydrate
2-(methoxycarbonylamino)-1-thionobenzimidazolecarboxylic acid, benzyl ester 2:1 zinc complex, dihydrate
2-(methoxycarbonylamino)-1-dithiobenzimidazolecarboxylic acid, benzyl ester 2:1 zinc complex, dihydrate
2-(methoxycarbonylamino)-1-dithiobenzimidazolecarboxylic acid, p-chlorobenzyl ester 2:1 zinc complex, dihydrate
2-(methoxycarbonylamino)-1-dithiobenzimidazolecarboxylic acid, p-bromophenyl ester 2:1 zinc complex, dihydrate
2-(methoxycarbonylamino)-1-thiolbenzimidazolecarboxylic acid, p-methylbenzyl ester 2:1 zinc complex, dihydrate
2-(methoxycarbonylamino)-1-thiolbenzimidazolecarboxylic acid, p-butylphenyl ester 2:1 zinc complex, dihydrate
2-(methoxycarbonylamino)-1-thiolbenzimidazolecarboxylic acid, p-nitrophenyl ester 2:1 zinc complex, dihydrate
2-(methoxycarbonylamino)-1-thiolbenzimidazolecarboxylic acid, p-nitrobenzyl ester 2:1 zinc complex, dihydrate
2-(methoxycarbonylamino)-1-thionobenzimidazolecarboxylic acid, p-methoxyphenyl ester 2:1 zinc complex, dihydrate
2-(methoxycarbonylamino)-1-thionobenzimidazolecarboxylic acid, p-butoxybenzyl ester 2:1 zinc complex, dihydrate
2-(methoxycarbonylamino)-1-dithiobenzimidazolecarboxylic acid, phenyl ester 2:1 zinc complex, dihydrate
1-(methylthio)-2-benzimidazolecarbamic acid, methyl ester 2:1 zinc complex, dihydrate
1-(isopropylthio)-2-benzimidazolecarbamic acid, methyl ester 2:1 zinc complex, dihydrate
1-(propylthio)-2-benzimidazolecarbamic acid, methyl ester 2:1 zinc complex, dihydrate
1-(trichloromethylthio)-2-benzimidazolecarbamic acid, methyl ester 2:1 zinc complex, dihydrate
1-(trichloromethylthio)-2-benzimidazolecarbamic acid, ethyl ester 2:1 zinc complex, dihydrate
1-(trichloromethylthio)-2-benzimidazolecarbamic acid, isopropyl ester 2:1 zinc complex, dihydrate
1-(3-chloropropylthio)-2-benzimidazolecarbamic acid, methyl ester 2:1 zinc complex, dihydrate
1-(pentachloroethylthio)-2-benzimidazolecarbamic acid, methyl ester 2:1 zinc complex, dihydrate
1-(phenylthio)-2-benzimidazolecarbamic acid, methyl ester 2:1 zinc complex, dihydrate
1-(benzylthio)-2-benzimidazolecarbamic acid, methyl ester 2:1 zinc complex, dihydrate
1-(o-nitrophenylthio)-2-benzimidazolecarbamic acid, methyl ester 2:1 zinc complex, dihydrate
1-(2,4-dinitrophenythio)-2-benzimidazolecarbamic acid, methyl ester 2:1 zinc complex, dihydrate
1-(p-chlorophenylthio)-2-benzimidazolecarbamic acid, methyl ester 2:1 zinc complex, dihydrate
1-(m-tolylthio)-2-benzimidazolecarbamic acid, methyl ester 2:1 zinc complex, dihydrate
1-(o-nitrobenzylthio)-2-benzimidazolecarbamic acid, methyl ester 2:1 zinc complex, dihydrate
1-(p-chlorobenzylthio)-2-benzimidazolecarbamic acid, methyl ester 2:1 zinc complex, dihydrate
1-(p-methylbenzylthio)-2-benzimidazolecarbamic acid, sec-butyl ester 2:1 zinc complex, dihydrate
1-(o-nitrobenzylthio)-2-benzimidazolecarbamic acid, isopropyl ester 2:1 zinc complex, dihydrate Example 18

The zinc complexes of Example 17 are dried as described in Example 14. The corresponding anhydrous forms of the products of Example 17 are obtained.

Example 19

The following manganese complexes can be prepared by substituting equivalent amounts of the corresponding 2-benzimidazolecarbamic acid, alkyl esters for 1-(butylcarbamoyl)-2-benzimidazolecarbamic acid, methyl ester in Example 2.

1-(benzylcarbamoyl)-2-benzimidazolecarbamic acid, methyl ester 2:1 manganese complex, dihydrate
1-(methylcarbamoyl)-2-benzimidazolecarbamic acid, methyl ester 2:1 manganese complex, dihydrate
1-(octylcarbamoyl)-2-benzimidazolecarbamic acid, methyl ester 2:1 manganese complex, dihydrate
1-(allylcarbamoyl)-2-benzimidazolecarbamic acid, methyl ester 2:1 manganese complex, dihydrate
1-(hexylcarbamoyl)-2-benzimidazolecarbamic acid, methyl ester 2:1 manganese complex, dihydrate
1-(p-nitrophenylcarbamoyl)-2-benzimidazolecarbamic acid, methyl ester 2:1 manganese complex, dihydrate
1-(butylcarbamoyl)-2-benzimidazolecarbamic acid, isopropyl ester 2:1 manganese complex, dihydrate
1-(p-methoxyphenylcarbamoyl)-2-benzimidazolecarbamic acid, methyl ester 2:1 manganese complex, dihydrate
1-(norbornylcarbamoyl)-2-benzimidazolecarbamic acid, methyl ester 2:1 manganese complex, dihydrate
1-(cyclohexylcarbamoyl)-2-benzimidazolecarbamic acid, methyl ester 2:1 manganese complex, dihydrate
1-(phenylcarbamoyl)-2-benzimidazolecarbamic acid, methyl ester 2:1 manganese complex, dihydrate
1-(cyclopropylcarbonyl)-2-benzimidazolecarbamic acid, methyl ester 2:1 manganese complex, dihydrate
1-(propionyl)-2-benzimidazolecarbamic acid, methyl ester 2:1 manganese complex, dihydrate
1-(benzoyl)-2-benzimidazolecarbamic acid, methyl ester 2:1 manganese complex, dihydrate
1-(trichloromethylthio)-2-benzimidazolecarbamic acid, methyl ester 2:1 manganese complex, dihydrate
1-(trichloromethylthio)-2-benzimidazolecarbamic acid, isopropyl ester 2:1 manganese complex, dihydrate
1-(cyclohexylmethylcarbamoyl)-2-benzimidazolecarbamic acid, methyl ester 2:1 manganese complex, dihydrate
1-(2,4-dinitrophenylthio)-2-benzimidazolecarbamic acid, methyl ester 2:1 manganese complex, dihydrate
1-(2,4-dinitrophenylthio)-2-benzimidazolecarbamic acid, isopropyl ester 2:1 manganese complex, dihydrate Example 20

The dihydrates of Example 19 are dried by the method of Example 16. The corresponding anhydrous forms are obtained.

Example 21

The following copper complexes can be prepared by substituting equivalent amounts of the corresponding 2-benzimidazolecarbamic acid, alkyl esters for 1-(butylcarbamoyl)-2-benzimidazolecarbamic acid, methyl ester in Example 3.

1-(benzylcarbamoyl)-2-benzimidazolecarbamic acid, methyl ester 2:1 copper complex
1-(methylcarbamoyl)-2-benzimidazolecarbamic acid, methyl ester 2:1 copper complex
1-(octylcarbamoyl)-2-benzimidazolecarbamic acid, methyl ester 2:1 copper complex
1-(allylcarbamoyl)-2-benzimidazolecarbamic acid, methyl ester 2:1 copper complex
1-(hexylcarbamoyl)-2-benzimidazolecarbamic acid, methyl ester 2:1 copper complex
1-(p-nitrophenylcarbamoyl)-2-benzimidazolecarbamic acid, methyl ester 2:1 copper complex
1-(p-methoxyphenylcarbamoyl)-2-benzimidazolecarbamic acid, methyl ester 2:1 copper complex
1-(cyclohexylcarbamoyl)-2-benzimidazolecarbamic acid, methyl ester 2:1 copper complex
1-(phenylcarbamoyl)-2-benzimidazolecarbamic acid, methyl ester 2:1 copper complex
1-(cyclohexylmethylcarbamoyl)-2-benzimidazolecarbamic acid, methyl ester 2:1 copper complex
1-(cyclopropylcarbonyl)-2-benzimidazolecarbamic acid, methyl ester 2:1 copper complex
1-(propionyl)-2-benzimidazolecarbamic acid, methyl ester 2:1 copper complex
1-(benzoyl)-2-benzimidazolecarbamic acid, methyl ester 2:1 copper complex
1-(trichloromethylthio)-2-benzimidazolecarbamic acid, methyl ester 2:1 copper complex
1-(2,4-dinitrophenylthio)-2-benzimidazolecarbamic acid, methyl ester 2:1 copper complex
1-(acetyl)-2-benzimidazolecarbamic acid, methyl ester 2:1 copper complex Example 22

The following nickel complexes can be prepared by substituting equivalent amounts of the corresponding 2-benzimidazolecarbamic acid, alkyl esters for 1-(butylcarbamoyl)-2-benzimidazolecarbamic acid, methyl ester in Example 4.

1-(allylcarbamoyl)-2-benzimidazolecarbamic acid, methyl ester 2:1 nickel complex, trihydrate
1-(hexylcarbamoyl)-2-benzimidazolecarbamic acid, methyl ester 2:1 nickel complex, trihydrate
1-(propionyl)-2-benzimidazolecarbamic acid, methyl ester 2:1 nickel complex, trihydrate
1-(p-methoxyphenylcarbamoyl)-2-benzimidazolecarbamic acid, methyl ester 2:1 nickel complex, trihydrate
1-(benzoyl)-2-benzimidazolecarbamic acid, methyl ester 2:1 nickel complex, trihydrate
1-(trimethylthio)-2-benzimidazolecarbamic acid, methyl ester 2:1 nickel complex, trihydrate
1-(2,4-dinitrophenylthio)-2-benzimidazolecarbamic acid, methyl ester 2:1 nickel complex, trihydrate Example 23

The following cobalt complexes can be prepared by substituting equivalent amounts of the corresponding 2-benzimidazolecarbamic acid, alkyl esters for 1-(butylcarbamoyl)-2-benzimidazolecarbamic acid, methyl ester in Example 5.

1-(hexylcarbamoyl)-2-benzimidazolecarbamic acid, methyl ester 2:1 cobalt complex, dihydrate
1-(octylcarbamoyl)-2-benzimidazolecarbamic acid, methyl ester 2:1 cobalt complex, dihydrate
1-(p-methoxyphenylcarbamoyl)-2-benzimidazolecarbamic acid, methyl ester 2:1 cobalt complex, dihydrate
1-(benzylcarbamoyl)-2-benzimidazolecarbamic acid, methyl ester 2:1 cobalt complex, dihydrate
1-(cyclohexylcarbamoyl)-2-benzimidazolecarbamic acid, methyl ester 2:1 cobalt complex, dihydrate
1-(acetyl)-2-benzimidazolecarbamic acid, methyl ester 2:1 cobalt complex, dihydrate
1-(trichloromethylthio)-2-benzimidazolecarbamic acid, methyl ester 2:1 cobalt complex, dihydrate
1-(p-nitrophenylcarbamoyl)-2-benzimidazolecarbamic acid, methyl ester 2:1 cobalt complex, dihydrate
1-(cyclopropylcarbonyl)-2-benzimidazolecarbamic acid, methyl ester 2:1 cobalt complex, dihydrate
1-(benzoyl)-2-benzimidazolecarbamic acid, methyl ester 2:1 cobalt complex, dihydrate
1-(2,4-dinitrophenylthio)-2-benzimidazolecarbamic acid, methyl ester 2:1 cobalt, dihydrate Example 24

The following transition metal complexes can be prepared by substituting equivalent amounts of the appropriate soluble salts for the zinc acetate dihydrate in Example 1.

1-(butylcarbamoyl)-2-benzimidazolecarbamic acid, methyl ester 2:1 iron complex, dihydrate
1-(butylcarbamoyl)-2-benzimidazolecarbamic acid, methyl ester 2:1 cadmium complex, dihydrate
1-(butylcarbamoyl)-2-benzimidazolecarbamic acid, methyl ester 2:1 chromium complex, dihydrate As mentioned previously, it has been found that the complexes of this invention possess outstanding fungicidal and mite ovicidal activity when employed to prevent or mitigate damage to plants and inanimate organic materials. The paragraphs which follow describe in more detail the utility of this invention.

The complexes of the invention control a wide variety of fungus diseases of foliage, fruit, stems and roots of growing plants without damage to the host. Fruits, tubers, bulbs, roots, seeds and other plant parts harvested for food, animal feed or for other purposes are protected from fungus deterioration during processing, distribution and storage. Seeds, tubers, cuttings and other plant propagation materials are protected from fungus attack during handling and storage, as well as in the soil after planting. Wood, fabric, fiber board, paper and other industrial materials are protected from unsightly stain and destructive decay caused by fungi. Luggage, shoes, shower curtains, carpets, mats, clothing and other useful household, public or industrial items are protected from rot, fungus stains and mold growth. Painted surfaces are protected from stain and discoloration by incorporation of a complex of this invention in the paint formulation.

The many fungi against which the complexes of this invention are active may be represented by, but is not intended to be limited to, the following: *Venturia inaequalis*, which causes apple scab; *Podosphaera leucotricha*, which causes powdery mildew on apples; *Uromyces phaseoli*, which causes bean rust; *Cercospora apii*, which causes early blight of celery; *Cercospora beticola*, which causes leaf spot of sugar beets; *Sclerotinia sclerotiorum*, which causes rot of vegetable crops, such as lettuce, beans, carrots, and celery; Colletotrichum spp., which causes anthracnose of fruits and vegetables, such as beans, tomatoes and coffee; *Septoria apii*, which causes late blight of celery; *Cercospora musae*, which causes Sigotoka disease of banana; Piricularia spp., which causes Johnson spot on banana; *Erysiphe cichoracearum*, which causes powdery mildew on cantaloupe and other cucurbit crops; *Penicillium digitatum*, Phomopsis supp., and *Diplodia natalensis*, which cause fruit rots on citrus; *Ceratostomella ulmi*, which causes Dutch elm disease; *Sphaerotheca humuli*, which causes powdery mildew on roses; *Diplocarpon roeae*, which causes black spot on roses; Ramularia spp., which causes leaf spots on ornamental plants; *Botrythis cinerea*, which causes blossom and fruit rots of ornamentals, fruits and vetgetables; *Uncinula necator*, which causes powdery mildew on grapes; *Guignardia bidwellii*, which causes grape black rot; *Melonconium fuligineum*, which causes white rot of grapes; *Coccomyces hiemalis*, which causes cherry leaf spot; Cytospora spp., which cause cankers of trees; *Cladosporium carpophilum*, which causes peach scab; *Fusicladium effusum*, which causes pecan scab; *Erysiphe graminis*, which causes powdery mildew on cereals; *Monolinia (Sclerotinia) laxa* and *M. fructicola*, which cause brown rot of stone fruits, such as peaches, cherries and apricots; *Pseudopenziza ribes*, which causes leaf spot on gooseberry; *Piricularia oryzae*, which causes rice blast; *Puccinia recondita*, *P. coronata* and *P. glumarum*, which cause leaf rusts of wheat, oats and grasses, respectively; *Puccinia graminis tritici*, which causes stem rust of wheat; *Claviceps purpurea*, which causes ergot of rye and grasses; *Aspergillus niger*, which causes cotton boll rot as well as decay following wounding in many plant tissues; *Aspergillus tereus*, which is common in soil and attacks vegetable matter; *Tilletia caries* and other tilletia species, which cause common bunt of wheat; *Ustilago tritici*, *Ustilago nigra*, *Ustilago avena* (and other Ustilago species), which cause loose smut of wheat, barley, and oats, respectively; *Urocystis tritici* and other Urocystis species, which cause loose smut of wheat; *Sphacelotheca sorghi*, which causes covered smut of soghum; *Ustilago hordei* and *Ustilago kolleri*, which cause covered smut of barley and oats, respectively; *Pithomyces chartorum*, which is present in turf, pastures, and other grassy areas and is known to have several secondary effects; various species of Rhizoctonia, Fusarium and Verticillium present in soil and attacking the roots or other underground parts and the vascular system of a variety of plants; various species of Penicillium growing on such things as fabric, fiber board, leather goods and paint; species of Myrothecium attacking such items as shower curtains, carpets, mats and clothing.

The mite ovicidal action of the complexes of this invention is useful in preventing the development of damaging populations of mites or in causing the gradual reduction of existing populations. The movement of mites is limited. Thus, an increase in population or the continuation of a high population in a particular locus depends largely upon the hatching of eggs laid in that locus.

Mite eggs do not hatch to produce living young if these eggs are treated with one of these complexes, or if they are laid on a surface containing one of these complexes. Further, the eggs will not hatch if they are laid by a female mite that has been in contact with one of these complexes, or are laid by a female mite that is ingesting or has recently ingested food such as plant juices containing one of these complexes. This interference with the hatching of eggs prevents the population from increasing significantly beyond that present at the time of treatment. Also, this ovicidal action, along with the high natural mortality of adults, can largely eliminate mites from an already infested area over a relatively short period of time. Further as long as the complexes are present on the surface the mites occupy or remain in their food supply, new populations cannot develop.

Many species of mites which cause damage to fruits, field crops, vegetables, and ornamentals under a wide variety of circumstances, are controlled by the complexes and methods of this invention. The extent of the practical utility of the mite control obtained is represented by, but is not intended to be limited to, the following listing of specific susceptible mites along with the types of damage that they can cause:

*Panonychus ulmi* (European red mite) and *Tetranychus urticae* (two-spotted mite) which are commonly called "orchard mites," these mites attack a great many deciduous tree fruits including apples, pears, cherries, plums and peaches; *Tetranychus atlanticus* (Atlantic or strawberry spider mites), *T. cinnabarinus* (carmine spider mite) and *T. pacificus* (Pacific spider mite), these mites attack cotton and numerous other crop plants; *Paratetranychus citri* (citrus red mite) and others which attack citrus; *Phyllocoptruta sleivora*, which causes citrus rust; *Bryobia praetiosa* (clover mite) which attacks clover, alfalfa and other crops; *Aceria neocynodomis* which attacks grasses and other plants; *Tyrophagus lintneri* which is a serious pest in stored foods and on cultivated mushrooms and *Lepidoglyphus destructor* which injures Kentucky bluegrass seed in storage.

The complexes of this invention when applied by certain of the methods of this invention enter and move freely within plants, i.e., they are systemic. Thus, both fungi and mites can be controlled in plants in parts well removed from the point of application. In view of this activity the complexes can be applied to seeds; thus the treatment of cucumber seeds with a few grams per 50 kilograms of seed of a complex of this invention provides control of powderly mildew (*Erysiphe cichoracearum*) and spider mites such as *Tetranychus urticae* on the resulting plants for periods in excess of 40 days. Applications to soil also provides control of certain foliage diseases and mites on plants growing in the treated soil. Spray or dust treatments of plant foliage and stems impart protection against both fungi and mites to other parts of the plant not actually sprayed and to new foliage developing later.

An additional valuable characteristic of the complexes of this invention is their ability to prevent the spread or to kill fungus infection already established within a plant, i.e. they are curative. Thus, the complexes need not be applied until after conditions develop which permit the actual initiation of fungus attack. This means that, under some circumstances, it is possible to avoid applying any chemical during the entire life of the crop. In other cases, only a part of the normal full schedule of pesticide application is required.

Therefore great savings both in chemical cost and application labor are possible with compounds capable of systemic and curative performance. Another saving is afforded by the complexes of this invention through the fact that both fungi and mites are controlled by applications of a single chemical.

The complexes of this invention provide protection from damage caused by fungi, mites or both when applied to the proper locus by the methods described hereinafter and at a sufficient rate to exert the desired fungicidal and mite ovicidal effect. They are especially suited for the protection of living plants such as fruit-bearing trees, nut-bearing trees, ornamental trees, forest trees, vegetable crops, horticultural crops (including ornamentals, small fruits and berries), fiber crops, grain and seed crops, sugarcane, sugar beets, pineapple, forage and hay crops, beans, peas, soybeans, peanuts, potatoes, sweetpotatoes, tobacco, hops, turf and pasture.

Living plants may be protected from fungi and mites by applying one or more of the complexes of this invention to the soil in which they are growing or in which they may subsequently be seeded or planted; or to seeds, tubers, bulbs or other plant reproductive parts prior to planting; as well as to foliage, stems and fruit of the living plant. Living plants can also be protected by dipping the root system or physically injecting the chemical or chemicals into roots or stems.

Soil applications are made from dusts, granules, pellets, slurries or solutions. Preferred rates for application of the complexes of this invention to soil in which plants are or will be growing range from 0.01 to 500 parts per million by weight of the soil in which the roots are or will be growing. More preferred use rates are in the range of 0.1 to 50 parts per million, and the most preferred rates are in the range of 0.25 to 25 parts per million.

Preferred rates for application to seeds, tubers, bulbs or other plant reproductive parts, range from 0.03 to 6000 grams of active complex of this invention per 50 kilograms of planting material treated. More preferred rates are in the range of 0.3 to 3000 grams of active complex per 50 kilograms. The most preferred rates are in the range of 2.8 to 1500 grams per 50 kilograms.

Applications are made from dusts, slurries or solutions. Such treatments protect the treated parts themselves from damage due to fungi, mites, or both, and in addition, impart extended protection against both types of pests to the resulting new plants.

Preferred rates for application of the complexes of this invention to foliage, stems and fruit of living plants range from 0.012 to 60 kilograms of active ingredient per hectare. More preferred rates are in the range of 0.025 to 30 kilograms per hectare and the most preferred rates are in the range of 0.05 to 15 kilograms per hectare. The optimum amount within this range depends upon a number of variables which are well-known to those skilled in the art of plant protection. These variables include, but are not limited to, the disease to be controlled, weather conditions expected, the type of crop stage of development of the crop, and the interval between applications. Applications within the range given may need to be repeated one or many more times at intervals of 1 to 60 days. Applications are made from dusts, slurries or solutions.

Preferred rates for dip applications to roots of living plants are in the range of 0.5 to 18,000 grams of active ingredient per 380 liters of water or other liquid carrier. More preferred rates are in the range of 4.5 to 9,000 grams per 380 liters and the most preferred rates are in the range of 45 to 4500 grams per 380 liters.

Preferred rates for injection into the roots or stems of living plants are in the range of 0.01 to 10,000 parts per million of water or other liquid carrier. More preferred rates are in the range of 0.1 to 5,000 parts per million. The most preferred rates are in the range of 1 to 1,000 parts per million.

Plant parts such as fruits, tubers, bulbs, foliage, roots and the like, harvested for food or feed, are protected from decay and other deterioration caused by fungi or mites during processing, distribution and storage by treatment with an active complex of this invention. The plant parts to be so protected can be dipped in a liquid bath containing the active ingredient, dusted with a finely divided preparation of the active ingredient, sprayed, misted with an aerosol containing the compound, or enclosed in wrapping or packing materials impregnated with the active compound.

If a liquid bath is used, it can contain an amount of the active ingredient in the range of 1 to 5,000 parts per million of the weight of the fluid. A more preferred range for the bath is 5 to 2,500 parts per million, and the most preferred range is 10 to 1,000 parts per million.

Dusts as well as wrapping or packing materials used for this type of application can contain 0.01 to 10% of the active ingredient. More preferred rates are in the range of 0.1 to 5% and the most preferred rates are in the range of 0.2 to 2.5%.

Wood, leather, fabric, fiber board, paper and other industrial materials of an organic nature can be protected from decomposition or discoloration by fungi and infestation by mites by coating, incorporating or impregnating with an effective amount of one or more of the complexes of this invention. The coating can be accomplished by dipping, spraying, flooding, misting (as with an aerosol) or dusting the material to be protected with a suitable composition containing the active ingredient. The preferred use rates for the active ingredient in the treating preparation actually applied to the material to be protected are in the range of 0.025 to 95% by weight. More preferred rates are in the range of 0.05 to 50%, with the most preferred rates being in the range of 0.1 to 25%.

Where incorporation or impregnation procedures are to be employed, use rates may be expressed in terms of the amount of active ingredient introduced into the material to be protected. The preferred use rates for these types of applications are in the range of 0.001 to 30 percent by weight of active ingredient in the final product. More preferred rates are in the range of 0.005 to 15% with the most preferred rates being in the range of 0.01 to 7%.

Luggage, shoes, shower curtains, carpets, mats, clothing and other useful household, public or industrial items are protected from rot, fungus stains and unsightly mold growth as well as infestation by mites by the active complexes of this invention. Again, either surface of deep protection can be obtained. Surface treatment is by dips, washes, sprays, aerosols or dust applications. Deep treatment is accomplished by penetrating solutions. Sprays, dips and washes contain the active compound of the invention at rates of 10 to 5,000 parts per million. Fluids for aerosol application and dusts contain 0.1 to 20% by weight. Penetrating solvent solutions contain an amount of the active ingredient that results in a deposit of 5 to 20,000 parts per million in the material to be protected.

Painted surfaces can be protected from unsightly stain and mold growth by incorporating in the paint formulation, prior to application, 5 to 20,000 parts per million of an active complex of this invention. More preferred rates are in the range of 10 to 10,000 parts per million and the most preferred rates are in the range of 20 to 5,000 parts per million. Such treatments with the complexes of this invention also protect the paint while still in the can from deterioration by fungi.

Damage by mites to stored organic products such as grain, seed, bulbs, tubers, meat or animal hides is kept to a minimum by treating the floors, walls, portions, and other parts of warehouses or other structures with one or more of the active complexes. Applications are made by the use of dusts, sprays, or aerosols with preferred use rates in the range of 0.05 to 1,000 grams of the active complex of this invention per 93 square meters of surface to be kept free of excessive mite populations.

Curative control of plant diseases with the complexes of this invention is enhanced if the treated plant parts are moist for one or more periods of 2 to 12 hours each soon after the active complex is applied. Often the slow drying of an original spray treatment or naturally occurring rains, mists, fogs or dews will accomplish this. Under other circumstances, such as during dry periods or in shelters such as greenhouses, it is necessary to keep the plants moist by some special effort for best results.

When the complexes of this invention are applied, their activity may be enhanced by using certain adjuvants, for example in the water in which they are dispersed. These adjuvants may be surface-active agents, oils, humectants, enzymes, carbohydrates, and organic acids. They improve the performance on tubers, on foliage, in treatments used for dip application to rooms of living plants, in the case of liquids used for injection into the roots or stems of living plants, or in mixtures used to treat fruits, tubers, bulbs, roots, and the like, after harvest.

Surface-active agents that enhance fungus control and mite control by the compounds of this invention include sulfonated and sulfated amines and amides, diphenyl sulfonate derivatives, ethoxylated alcohols, ethoxylated alkylphenols, ethoxylated fatty acids, ethoxylated fatty esters and oils, polyethylene oxide/polypropylene oxide combinations, alkylsulfonates, fluorocarbon surfactants, glycerol esters, ethoxylated alcohol sulfates, glycol esters, isethionates, sulfated ethoxylated alkylphenols, lanolin derivatives, lecithin and lecithin derivatives, alkanol amides, phosphate derivatives, monoglycerides and derivatives, quaternaries, sorbitan and sorbitol derivatives, sulfosuccinates, alcohol sulfates, sulfated fatty esters, sulfated and sulfonated oils and fatty acids, alkylbenzenesulfonates, imidazolines, taurates, ethoxylated mercaptans, ethoxylated amines and amides, modified phthalic glycerol alkyd resins, and similar materials. The oils include nonphytotoxic aliphatic spray oils and triglycerides, either with or without emulsifier to permit dispersion in water. Humectants such as glycerin or ethylene glycols, enzymes such as bromelin, and carbohydrates such as glucose, lactose, and dextrose are also useful. Organic acids of interest include glycolic and gluconic acids. Although the precise manner in which these additives improve the performance of the fungicides of this invention is not known, the effect is, nevertheless, startling, and it is possible that these additives improve the penetration into the plant or translocation throughout the plant of the fungicides of this invention.

Preferred surface-active agents to improve the fungicidal and mite ovicidal activity of these compounds are products such as dioctyl sodium sulfosuccinates ("Aerosol" OT and "Aerosol" OT–B), blends of aromatic sulfonates and ethylene oxide derivatives ("Argrimul" GM, "Agrimul" A–100, "Agrimul" N–100, "Emcol" H50A, "Emcol" H53), polyoxyethylene sorbitol oleate/laurate ("Atlox" 1045A), sodium lauryl sulfate ("Duponol" ME), polyoxyethylated vegetable oils ("Emulphor" EL719), lecithin derivatives ("Emultex" R), acidic complex organic phosphate esters ("Gafac" RE–610, "Victawet"), aliphatic amide alkyl sulfonates ("Hyfoam" Base LL), oleic acid esters of sodium isethionate ("Igepon AP78), sodium N-methyl-N-oleoyl taurate ("Igepon AP77), sodium salt of sulfated lauryl and myristyl colamide ("Intramine" Y), polyethylene glycol 400 oleic acid ester ("Nonisol" 210), sodium dodecylbenzene sulfonate ("Sul-Fon-Ate" AA 10, "Ultrawet" K), polyoxyethylene ethers with long-chain alcohols ("Surfonic" LR 30, "Alfonic" 1012–6, "Brij" 30, "Tergitol" TMN), ethylene oxide condensates with propylene oxide/ethylene diamine condensates ("Tetronic" 504), polyhydric alcohol esters ("Trem" 014), modified phthalic glycerol alkyd resins ("Triton" B 1956), quaternaries ("Zelec" DP), alkylphenol ethylene oxide condensates ("Dowfax" 9N4, "Dowfax" 9N10, "Hyonic" 9510, "Tergitols") and the like. Examples given in parentheses are illustrative and do not exclude other unnamed commercial products. Examples of other surface active agents in each of these several categories are listed in "Detergents and Emulsifiers," 1965 Annual, or 1966 Annual, published by John W.

McCutcheon, Inc., 236 Mt. Kemble Avenue, Morristown, N.J.

Preferred oils include spray oils such as "Orchex" 796 made emulsifiable wtih "Triton" X–45, castor oil made emulsifiable with "Triton" X–114, corn oil made emulsifiable with "Triton" X–114, Volick Oil #70, Sunoco Oil No. 7E and similar nonphytotoxic spray oils of vegetable, animal or mineral origin.

The complexes of this invention and the oils, surfactants, humectants, enzymes, carbohydrates, and acids useful to enhance the fungicidal and mite-ovicidal activity of these complexes can be brought together in several ways. For example, the additive which will enhance activity can be mixed with complexes of the invention when spray slurries are being prepared. It is often also possible and convenient to produce formulations in which the additive and the complex of the invention will both be present in the composition, which is then convenient to apply. Such compositions can be powders, granules, suspensions, or even solutions, depending upon the physical and chemical characteristics of the components that are to be prepared. It will be readily understood by those skilled in the trade and in the light of the above teachings that the ratios of active ingredient complex to additives may vary widely. Thus, the additive may be present in such mixtures within the range of from 33 to 10,000 parts per 100 parts of the complexes of this invention. More preferred are rates of from 40 to 5,000 parts of additive per 100 parts of active ingredient and a range of ratios from 50 to 3,500 per 100 parts of complex is even more preferred.

Compositions of this invention are formulated by mixing a complex of this invention with one or more surface-active agents.

The surface-active agents used in this invention can be wetting, dispersing or emulsifying agents. They may act as wetting agents for wettable powders and dusts, as dispersing agents for wettable powders and suspensions and as emulsifying agents for emulsifiable concentrates. Surfactants may also enhance the biological activity of the complexes of this invention. Such surface-active agents can include such anionic, cationic and nonionic agents as have heretofore been generally employed in plant control compositions of similar type. Suitable surface-active agents are set out, for example, in "Detergents and Emulsifiers Annual—1967" by John W. McCutcheon, Inc. Other surface active agents not listed by McCutcheon but still effective dispersants by virtue of protective colloid action include methyl cellulose, polyvinyl alcohol, hydroxyethylcellulose, and alkyl substituted polyvinyl pyrrolidones.

Suitable surface-active agents for use in compositions of this invention include polyethylene glycol esters with fatty and rosin acids, polyethylene glycol ethers with alkyl phenols or with long-chain aliphatic alcohols, polyethylene glycol ethers with sorbitan fatty acid esters and polyoxyethylene thioethers. Other suitable surfactants include amine, alkali and alkaline earth salts of alkyl aryl sulfonic acids, amine, alkali and alkaline earth fatty alcohol sulfates, dialkyl esters of alkali metal sulfosuccinates, fatty acid esters of amine, alkali and alkaline earth isethionates and taurates, amine, alkali and alkaline earth salts of lignin sulfonic acids, methylated or hydroxyethylated cellulose, polyvinyl alcohols, alkyl-substituted polyvinyl pyrrolidone, amine, alkali and alkaline earth salts of polymerized alkylnaphthalenesulfonic acids, and long-chain quatenary ammonium complexes. Anionic and non-ionic surface-active agents are preferred.

Among preferred wetting agents are sodium alkylnaphthalenesulfonates, sodium dioctylsulfosuccinate, sodium dodecyl benzenesulfonate, ethylene oxide condensates with alkylated phenols such as octyl-, nonyl- and dodecyl phenol, sodium lauryl sulfate, and trimethylnonyl polyethylene glycols. Among preferred dispersing agents are sodium, calcium and magnesium lignin sulfonates, low-viscosity methyl cellulose, low-viscosity polyvinyl alcohol, alkylated polyvinyl pyrrolidone, polymerized alkylnaphthalenesulfonates, sodium N-oleyl or N-lauryl isethionates, sodium N-methyl-N-palmitoyl taurate and dodecylphenol polyethylene glycol esters.

Among preferred emulsifying agents are ethylene oxide adducts of lauric, oleic, palmitic or stearic acid esters of sorbitan or sorbitol, polyethylene glycol esters with lauric, oleic, palmitic, stearic or rosin acids, oil-soluble alkylarylsulfonates, oil-soluble polyoxyethylene ethers with octyl-, nonyl- and dodecylphenol, polyoxyethylene adducts to long-chain mercaptans, and mixtures of these surfactants.

Compositions of this invention will contain, in addition to surface-active agents, solid or liquid diluents to produce wettable powders, dusts, granules or emulsifiable liquids as desired.

(A) Wettable powders.—Wettable powders are compositions which usually contain inert solid diluents in addition to surfactants. These inert diluents may serve several purposes. They can act as grinding aids to prevent mill smear and screen blinding, they can aid rapid dispersion of the mix when placed in water, they can adsorb liquid or low-melting solid active material to produce a free-flowing solid product, they can prevent agglomeration into lumps upon prolonged hot storage and they can permit preparation of compositions with a controlled amount of active ingredient so that proper dosage is easily measured by the consumer.

Suitable diluents may be either inorganic or organic in origin. These include the natural clays, diatomaceous earths, synthetic mineral fillers derived from silica or silicates, blancfixe or barytes, insoluble salts produced by precipitation in fluffy form such as tricalcium phosphate or calcium carbonate, and powdered organic diluents such as shell flours, wood flours, corn cob flour, or carbohydrates. Preferred fillers for the compositions of this invention include kaolin clays, attapulgite clay, nonswelling calcium magnesium montmorillonites, synthetic silicas, synthetic calcium and magnesium silicates, diatomaceous silica, sucrose, cob flour and barium sulfate.

Wettable powders will normally contain both a wetter and a dispersant. Most preferred for dry wettable powders are those anionic and nonionic surfactants which exist in solid form. Occasionally a liquid, nonionic surfactant, normally considered as emulsifying agent can be used to produce both wetting and dispersion.

Wetting and dispersing agents in wettable powders of this invention, when taken together, will comprise from about 1.0 weight percent to 8.0 weight percent of the total composition. The active component will be present at a concentration of from about 25% to 80% and diluent makes up the balance to 100%. Where needed, a corrosion inhibitor or foaming inhibitor may be added at rates of 0.1% to 1.0% with a corresponding reduction in diluent.

(B) Dusts.—Dust compositions are those intended for application in dry form with suitable dusting equipment. Since wind drift is undesirable when applying dusts, the most suitable dust diluents are those which are dense and rapid settling. These include kaolinites, talcs, pyrophyllites, ground phosphate rock, Sericite, and ground tobacco stems. However, dusts are usually most easily prepared by diluting an existing high-strength wettable powder with a dense diluent so that the final dust will frequently contain a fraction of light, absorptive diluent as well as the more desirable dense filler.

A wetting agent is desirable in dust formulations so that adhesion to dew-covered foliage is enhanced. Dusts made from wettable powders will usually contain sufficient wetter, but dusts made directly from unformulated active will usually contain an added wetting agent. Dry solid anionic or nonionic wetters are preferred.

Dust formulations will normally contain from 5.0 weight percent to 25 weight percent of active material, from 0.005% to 1.0% wetting agent, and from 3% to 20% light grinding aid diluent and the balance dense, rapid settling diluent. If made by diluting a prepared wettable powder it will also contain a small amount of dispersing agent which has no active role when the composition is used as a dry dust.

(C) Emulsifiable liquids.—Emulsifiable liquids are formulated by combining the complexes of this invention with a suitable emulsifier and an organic liquid with low water solubility. The active component may be completely dissolved in the organic liquid or it may be a finely ground suspension in a nonsolvent liquid. Suitable organic liquids include alkylated naphthalenes, xylene, high-molecular-weight ketones such as isophorones and dibutyl or diamyl ketone, esters such as amyl acetate, normal- or iso-paraffins and purified white oils. Most preferred emulsifiers are blends of oil-soluble sulfonates and nonionic polyoxyethylene glycol esters or ethers of fatty acids or alkylated phenols.

The active component in emulsifiable concentrates will be present at from 10 weight percent to about 40 weight percent. Combined emulsifiers will be present at from 3 weight percent to about 10 weight percent and the balance will be an organic carrier liquid or solvent.

(D) Granules.—Soil treatments with fungicides, either pre- or post-emergence can frequently be most readily applied with granules. Granular products, with the complexes of this invention, can be made in a number of ways. The active materials can be dissolved in a volatile carrier and sprayed upon preformed granules. They may be mixed as powders with suitable diluents and binders, then moistened and granulated followed by drying. Powders may also be applied to coarsely porous granules by tumbling together and applying some non-volatile liquid such as oil, glycol or a liquid nonionic surfactant to act as a binder. Rates of granule disintegration and dispersion of active material in moist soil can be controlled by choice of added surfactants or selection of the binders used to form the granule.

Suitable preformed granules include those made from attapulgite clay, granular expanded vermiculite, ground corn cobs, ground nut shells or preformed kaolinite granules. When active fungicide is placed upon such carriers the concentration may range from 1% to 25%. However, it is difficult to prevent segregation of active and carrier in concentration ranges above about 10% on preformed granules. When higher concentrations of active are desired best results are obtained by premixing powdered active, diluents, binders and surfactants then granulating so that the active is distributed throughout the granule and not solely upon its surface.

Suitable diluents for the preparation of granules by granulation or extrusion include kaolin clays, non-swelling Ca, Mg montmorillonites, and gypsum. Cohesion to a firm granule is usually obtained by moistening compacting and drying, with or without some binding agent. Kaolin clays form firm granules if bound together with gelatinous agents such as methylcellulose, natural gums or swelling bentonite. Ca, Mg bentonites require no binder, and gypsum can be made to form firm granules with either the addition of plaster of Paris or certain salts such as ammonium sulfate, potassium sulfate or urea which form double salts with gypsum.

The active content of formed granules can range from 1–90% although 75% active represents about the upper level if controlled disintegration of the granule in moist soil is desired. Control of disintegration rate is attained by controlled compaction, e.g. controlled extrusion pressure, and by the addition of inert water-soluble components such as sodium sulfate which can leach away.

Such compositions can contain, in addition to the active ingredient of this invention, conventional insecticides, miticides, bactericides, nematocides, fungicides, of other agricultural chemicals such as fruit-set agents, fruit-thinning compounds, fertilizer ingredients and the like, so that the compositions can serve useful purposes in addition to the control of fungi and mite infestations.

The following are illustrative of the agricultural chemicals that can be included in the compositions or, additionally, that may be added to sprays containing one or more of the active complexes.

1,2,3,4,10,10-hexachloro-1,4,4a,5,8,8a-hexahydro-1,4-endoexo-5,8-dimethanonaphthalene (aldrin);
1,2,3,4,5,6-hexachlorocyclohexane (lindane);
2,3,4,5,6,7,8,8-octachloro-4,7-methano-3a-4,7,7a-tetrahydroindane;
1,1,1-trichloro-2,2-bis(p-chlorophenyl)ethane (DDT);
1,2,3,4,10,10-hexachloro-6,7-epoxy-1,4,4a-5,6,7,8,8a-octahydro-1,4-endo-exo-5,8-dimethanonaphthalene (dieldrin);
1,2,3,4,10,10-hexachloro-6,7-epoxy-1,4,4a,5,6,7,8,8a-octahydro-1,4-endo-endo-5,6-dimethanonaphthalene (endrin);
1 (or 3a), 4,5,6,6,7,7-heptachloro-3a-4,7,7a-tetrahydro-4,7-methanoindene;
1,1,1-trichloro-2,2-bis(p-methoxyphenyl)ethane (methoxychlor);
1,1-dichloro-2,2-bis(p-chlorophenyl)ethane;
chlorinated camphene having a chlorine content of 67–69%;
2-nitro-1,1-bis(p-chlorophenyl)butane;
1-naphthyl-N-methylcarbamate ("Sevin" ®);
methylcarbamic acid, ester with phenol, 4-(dimethylamino)-3,5-dimethyl;
methylcarbamic acid, ester with 1,3-dithiolan-2-one oxime;
O,O-diethyl O-(2-isopropyl-4-methylpyrimid-6-yl) thiophosphate;
O,O-dimethyl 1-hydroxy-2,2,2-trichloroethyl phosphonate;
O,O-dimethyl S-(1,2-dicarbethoxyethyl) dithiophosphate (malathion);
O,O-dimethyl O-p-nitrophenyl thiophosphate (methyl parathion);
O,O-dimethyl O-(3-chloro-4-nitrophenyl) thiophosphate;
O,O-diethyl O-p-nitrophenyl thiophosphate (parathion);
dl-2-cyclopentenyl-4-hydroxy-3-methyl-2-cyclopenten-1-one chrysanthemumate;
O,O-dimethyl-O-(2,2-dichlorovinyl) phosphate (DDVP);
mixture containing 53.3% "Bulan," 26.7% "Prolan" and 20.0% related complexes;
O,O-dimethyl O-(2,4,5-trichlorophenyl) phosphorothioate;
O,O-dimethyl-S-(4-oxo-1,2,3-benzotriazine-3-(4H)-yl-methyl) phosphorodithioate ("Guthion"®);
bis(dimethylamino)phosphonous anhydride;
O,O-diethyl O-(2-keto-4-methyl-7-a'-pyranyl) thiophosphate;
O,O-diethyl(S-ethyl mercaptomethyl) dithiophosphate;
calcium arsenate;
sodium aluminofluoride;
dibasic lead arsenate;
2'-chloroethyl 1-methyl-2-(p-tert-butylphenoxy)ethyl sulfite;
azobenzene;
ethyl 2-hydroxy-2,2-bis(4-chlorophenyl)acetate;
O,O-diethyl O-[2-(ethylmercapto)-ethyl] thiophosphate;
2,4-dinitro-6-sec-butylphenol;
toxaphene;
O-ethyl O-p-nitrophenylbenzenethiophosphonate;
4-chlorophenyl-4-chlorobenzenesulfonate;
p-chlorophenyl phenyl sulfone;
tetraethyl pyrophosphate;
1,1-bis(p-chlorophenyl)ethanol;
1,1-bis(chlorophenyl)-2,2,2-trichloroethanol;
p-chlorophenyl p-chlorobenzyl sulfide;
bis(p-chlorophenoxy)methane;
3-(1-methyl-2-pyrrolidyl)pyridine;

mixed ester of pyrethrolone and cinerolone keto-alcohols and two chrysanthemum acids;
cube and berris, both whole root and powdered;
ryanodine;
mixture of alkaloids known as veratrine;
dl-2-allyl-4-hydroxy-3-methyl-2-cyclopenten-1-one esterified with a mixture of cis and trans dl-chrysanthemum monocarboxylic acids;
butoxypolypropylene glycol;
p-dichlorobenzene;
2-butoxy-2'-thiocyanodiethyl ether;
naphthalene;
methyl O-carbamylthiolacetohydroxamate;
1,1-dichloro-2,2-bis(p-ethylphenyl)ethane;
methyl O-(methylcarbamyl)thiolacetohydroxamate;
p-dimethylaminobenzenediazo sodium sulfonate;
quinone oxyaminobenzooxohydrazone;
tetraalkyl thiuram disulfides such as tetramethyl thiuram disulfide or tetraethyl thiuram disulfide;
metal salts of ethylenebisdithiocarbamic acid, e.g. manganese, zinc, iron and sodium salts;
pentachloronitrobenzene;
n-dodecylguanidine acetate (dodine);
N-trichloromethylthiotetrahydrophthalimide (captan);
phenylmercury acetate;
2,4-dichloro-6-(o-chloroaniline)-s-triazine ("Dyrene"®);
N-methylmercury p-toluenesulfonanilide;
chlorophenolmercury hydroxides;
nitrophenolmercury hydroxides;
ethylmercury acetate;
ethylmercury 2,3-dihydroxypropylmercaptide;
methylmercury acetate;
methylmercury 2,3-dihydroxypropylmercaptide;
3,3' - ethylenebis(tetrahydro - 4,6-dimethyl-2H-1,3,5-thiodiazine-2-thione);
methylmercury dicyandiamide;
N-ethylmercury-p-toluenesulfonanilide;
1,4-dichloro-2,5-dimethoxybenzene;
metal (e.g. iron, sodium and zinc), ammonium and amine salts of dialkyl dithiocarbamic acids;
tetrachloronitroanisole;
hexachlorobenzene;
hexachlorophene;
methylmercury nitrile;
tetrachloroquinine;
N-trichloromethylthiophthalimide;
1,2-dibromo-3-chloroprene;
1,2-dibromo-3-chloropropene;
dichloropropane-dichloropropene mixture;
ethylene dibromide;
chloropicrin;
sodium dimethyldithiocarbamate;
tetrachloroisophthalonitrile;
1-benzimidazolecarboxylic acid, 2-carboxyamino, dimethyl ester;
streptomycin;
2-(2,4,5-trichlorophenoxy)propionic acid;
p-chlorophenoxyacetic acid;
1-naphthaleneacetamide; and
N-(1-naphthyl)acetamide.

The agricultural chemicals listed above are merely exemplary of the complexes which can be mixed with the active complexes and are not intended to in any way limit the invention.

The use of pesticides such as those listed above in combination with a compound within the scope of this invention sometimes appears to greatly enchance the activity of the active complex. In other words, an unexpected degree of activity is sometimes seen when another pesticide is used along with the active complex.

The complexes of the invention also have utility in that when they are added to sewage, they result in an increase in the rate of sewage decomposition. When added to soil, the complexes increase the rate whereby the nitrogen present in fertilizers is converted into usable plant food. The complexes also posses activity against the helminth parasites of warm blooded animals.

The complexes of the invention also have utility in that they reduce the rate of degradation of chlorophyll and keep plants in an effective photosynthetic condition longer. The extension of the photosynthetic period or antisenescence activity results in increased yields of many grains, fruits and vegetables. Also, the storage life is increased for green leafy vegetables, certain ornamental plant materials, green-chopped forage, and the like.

The utility of the complexes of the invention will be exemplified by the following examples. All parts are parts by weight unless otherwise indicated.

WETTABLE POWDERS

Example 25

| | Percent |
|---|---|
| 1-(butylcarbamoyl)-2-benzimidazole - carbamic acid, methyl ester, 2:1 complex with zinc, dihydrate | 70 |
| Dioctyl sodium sulfosuccinate | 4 |
| Oleyl ester of sodium isethionate | 3 |
| Diatomaceous silica | 23 |

The above wettable powder is prepared by blending the components together, then micropulverizing in a hammer mill, followed by air milling to further reduce particle size.

The above composition is added to water in such an amount to provide 300 p.p.m. of the active ingredient of invention. This preparation is then sprayed on alternate trees in an apple orchard in Virginia. The trees are known to have been infected with the apple scab pathogen two days before the first treatment. There is also evidence of incipient powdery mildew growth on a few of the leaves of each tree, and the overwintering population of spider mites are beginning to infest the orchard.

The spray is applied to fifteen-year-old apple trees at the rate of 50 liters per tree at the pink stage of early bloom. Repeat sprays are applied every three weeks during the spring and summer. At harvest time the leaves on the sprayed trees are healthy and free of spider mites, and the fruit is full sized with good color and a smooth finish. The untreated trees, on the other hand, are heavily diseased with scab, and powdery mildew and bronzed by a high population of spider mites. The fruit on untreated trees is small and distorted with scab lesions. Thus, the composition of this invention, applied in the manner described, destroys both apple scab and powdery mildew inciting fungi and prevents a build up of spider mites, and therefore prevents disease and damage by these organisms.

Any of the complexes described in Examples 2 through 24 can be formulated in the above manner and when applied will give similar results.

Example 26

| | Percent |
|---|---|
| 1 - butylcarbamoyl - 2 - benzimidazolecarbamic acid, methyl ester, 2:1 complex with manganese, dihydrate | 50 |
| Dodecylphenol condensate with 9 mols ethylene oxide | 3 |
| Sodium N-methyl, N-oleoyltaurate | 1 |
| Kaolin clay | 46 |

The above mix is blended and milled in the same manner as Example 25.

The above composition is added to water. The amount of the composition used is such as to provide 300 p.p.m. of the active complex of this invention in the final aqueous preparation. Selected plots in a sugar beet field in Minnesota are sprayed with the above preparation at 21-day intervals at a rate of 600 liters per hectare.

During the three months after the start of the test, weather is favorable for frequent infections by the sugar beet leaf spot fungus. At harvest time, the beets in the treated plots are large and vigorous with healthy foliage. The beets in the untreated areas surrounding the treated plots, on the other hand, are small and the leaves are spotted and dying because of numerous infections by the sugar beet leaf spot fungus.

Example 27

| | Percent |
|---|---|
| 1 - hexylcarbamoyl - 2 - benzimidazolecarbamic acid, methyl ester, 2:1 complex with zinc, dihydrate | 70 |
| Sodium lauryl sulfate | 2 |
| Sodium lignin sulfonate | 2 |
| Minus 270 mesh corn cob flour | 26 |

The above composition is blended, then pin milled until the active approaches an average particle size of about 10 microns.

The above composition is added to water containing 300 p.p.m. of a modified phthalic glycerol alkyd resin surface active agent ("Triton" B 1956) in an amount to provide 300 p.p.m. of the active complex of this invention. This aqueous preparation is sprayed at a rate of 15 liters per tree on alternate trees in a peach orchard in North Carolina. Spraying is started at the pink stage of bloom and repeated at 14 day intervals until harvest time. The remaining trees in the planting are left untreated.

There are several warm wet periods during the blossom and early growing season and fungus pathogens have a good opportunity to infect the blossoms and fruit. At the time of harvest the treated trees are healthy and the fruit is free of disease. The fruit on the untreated trees, on the other hand, is badly rotted by the brown rot fungus and disfigured with peach scab.

Example 28

| | Percent |
|---|---|
| 1 - (p - methoxybenzylcarbamoyl) - 2 - benzimidazolecarbamic acid, methyl ester, 2:1 complex with zinc, dihydrate | 50 |
| Diamyl sodium sulfosuccinate | 4 |
| Dehydrated, partially desulfonated sodium lignin sulfonate | 46 |

The above components are blended, then ground in a fluid energy mill until the active is substantially all below 5 microns.

The above composition is added to water containing 500 p.p.m. of modified phthalic glycerol alcohol resins ("Triton" B 1956). The amount of the composition is such as to provide 250 p.p.m. of the active complex of this invention in the final aqueous preparation. This preparation is then sprayed on alternate rose bushes with enough water to thoroughly wet the foliage. Rose bushes are selected in a planting heavily infected with black spot, powderly mildew, and infested wtih spider mites. The same plants are sprayed every 7 days during the growing season and the alternate plants are left unsprayed.

Two months after the treatments are initiated the treated roses are healthy, growing vigorously and producing an abundance of blooms. The untreated bushes are, on the other hand, almost completely defoliated by disease and supporting only a few small blossoms. The few remaining leaves were covered with mildew or injured by mites or black spot infections.

All complexes of this invention can be formulated in the same way with similar results.

Example 29

| | Percent |
|---|---|
| 1 - (butylcarbamoyl) - 2 - benzimidazolecarbamic acid, methyl ester, 2:1 complex with manganese, monohydrate | 50 |
| Dioctyl sodium sulfosuccinate 85% with Na benzoate (Aerosol OTB) | 3 |
| Low-viscosity methyl cellulose | 0.75 |
| Cane sugar | 46.25 |

The above components are blended and micropulverized, then air-filled until substantially all particles are 5 microns or less.

A uniform field planting of cantaloupe in North Carolina is inoculated with the powdery mildew fungus (*Erysiphe cichoracearum*). After 10 days this organism has become well established in the plants. At this time alternate rows are sprayed with water containing a suspension of the wettable powder prepared as described above. The concentration of this chemical suspension is such as to give 227 grams of the active compound of this invention per 378 liters of water (0.06%). The spray is applied at a volume of 1410 liters per hectare. The remaining rows are left unsprayed.

After another 15 days the unsprayed rows are heavily damaged by powdery mildew and some of the plants are dying. The sprayed rows, however, are healthy and growing rapidly. The results indicate that the active compound of the suspension acts as a curative fungicide.

Example 30

| | Percent |
|---|---|
| 1-(butylcarbamoyl) - 2 - benzimidazolecarbamic acid, methyl ester, 2:1 complex with manganese | 50 |
| Sodium lauryl sulfate | 2 |
| Nonylphenoxypoly(ethyleneoxy)ethanol (40 mols $Et_2O$) | 4 |
| Pentaerythritol | 44 |

The above composition is blended, then micropulverized, followed by air-milling to further reduce particle size until substantially all of the material consists of particles which are smaller than 5 microns as measured by Andersen pipette sedimentation.

Six field crates of oranges are picked from a commercial grove in Florida. Three crates of oranges are dipped for three minutes in a water bath containing a suspension made from the above formulation in an amount to give 300 parts per million by weight of the active ingredient of this invention. The remaining three crates are dipped in a similar fashion in water. All crates are set aside in a citrus storage house for three weeks.

At the end of this time all fruit are examined. The fruit that has been dip-treated with the compound of this invention is still in good condition, but the fruit that is not so protected is largely rotted by the blue mold fungus (*Penicillium digitatum*).

Example 31

| | Percent |
|---|---|
| 1-(butylcarbamoyl) - 2 - benzimidazolecarbamic acid, methyl ester, 2:1 complex with zinc | 60 |
| Alkylnaphthalenesulfonate, Na salt | 3 |
| N-methyl-N-palmitoyltaurate, Na salt | 2 |
| Cane sugar | 35 |

The above components are blended, micropulverized and air-milled to 5 micron particle size or less, as determined by microscopic inspection of aqueous dispersions of the formulation.

The above 50% wettable powder formulation is dispersed in water to give an active ingredient concentration of 3.6 grams per liter of water. Eight uniform apple trees of the same variety are selected for testing. Four of these are sprayed to run-off, which is approximately 2850 liters per hectare, at weekly intervals during the growing season with the above formulation, and the other four trees are left unsprayed.

By the end of the season the unsprayed trees have developed very high populations of orchard mites and are highly infected with apple scab, *Venturia inaequalis*. Due to the feeding of the mites, the foliage is russeted and drops prematurely. Also the untreated trees have poor twig growth and small, spotted fruit. The trees sprayed with the complex of this invention are essentially free of mites, their eggs and apple scab. As a result of the excellent mite control, the sprayed trees have foliage of a thrifty, dark green color, and they exhibit good twig growth and fruit size.

GRANULES

Example 32

| | Percent |
|---|---|
| 1-butylcarbamoyl - 2 - benzimidazolecarbamic acid, methyl ester 2:1 complex with zinc, monohydrate | 10 |
| Alkylnaphthalenesulfonic acid, sodium salt | 1 |
| Expanded vermiculite granules 30-60 mesh | 89 |

The active material and surfactant are taken up in acetone and sprayed upon the vermiculite with tumbling, followed by evaporation of the acetone.

A cucumber planting is established by dropping three cucumber seeds into holes in the soil three centimeters deep and spaced one meter apart in the row. Rows are 3 meters apart. Alternate rows are treated by placing 2 grams of the granules described above into the planting holes. Adjacent rows are left untreated. Six weeks after planting, the plants in the treated rows are completely healthy. The plants in the untreated rows are heavily diseased with powdery mildew.

This

I claim:
1. A novel complex of the formula:

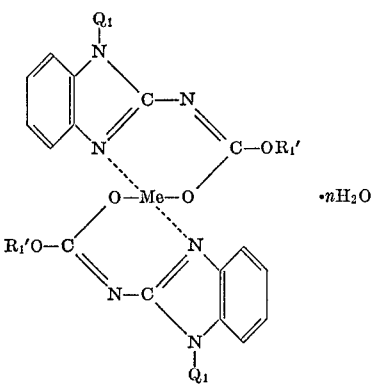

wherein
$Q_1$ is

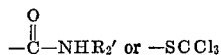

$R_1'$ is methyl or ethyl;
$R_2'$ is alkyl of 1 through 8 carbon atoms;
Me is zinc, copper, nickel, manganese, cobalt, cadmium, iron, or chromium; and
$n$ is 0, 1, 1½ or 2.

2. A complex of the formula of claim 1 which is 1-(butylcarbamoyl) - 2 - benzimidazolecarbamic acid, methyl ester, 2:1 zinc complex, dihydrate.

3. A complex of the formula of claim 1 which is 1-(butylcarbamoyl) - 2 - benzimidazolecarbamic acid, methyl ester 2:1 zinc complex, monohydrate.

4. A complex of the formula of claim 1 which is 1-(butylcarbamoyl) - 2 - benzimidazolecarbamic acid, methyl ester 2:1 zinc complex.

5. A complex of the formula of claim 1 which is 1-(butylcarbamoyl) - 2 - benzimidazolecarbamic acid, methyl ester 2:1 manganese complex, dihydrate.

6. A complex of the formula of claim 1 which is 1-(butylcarbamoyl) - 2 - benzimidazolecarbamic acid, methyl ester, 2:1 manganese complex.

7. A complex of the formula of claim 1 which is 1-(butylcarbamoyl) - 2 - benzimidazolecarbamic acid, methyl ester 2:1 manganese complex monohydrate.

8. A process for making the complexes of claim 1 comprising preparing a three-phase system of:
   (a) an aqueous solution of the acetate, chloride, sulfate, nitrate or citrate of zinc, manganese, nickel, cobalt, copper, cadmium, iron or chromium;
   (b) a water-immiscible organic solvent; and
   (c) in said solvent a solid benzimidazolecarbamate of the formula:

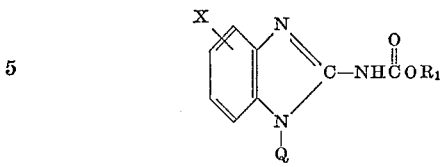

wherein Q, X, $R_1$, $R_2$, $R_3$, $R_4$, Z, D and E are as defined in claim 1;

agitating said three-phase system until the solid phase passes from the organic phase to the aqueous phase; and recovering the resulting complex.

9. The process of claim 2 wherein the aqueous solution is zinc acetate or manganese acetate.

10. The process of claim 9 wherein the water-immiscible organic solvent is ethyl acetate, amyl acetate or diethyl ether.

11. The process of claim 10 wherein the benzimidazolecarbamate is 1-(butylcarbamoyl)-2-benzimidazolecarbamic acid, methyl ester.

12. A process for making the complexes of claim 1 comprising a system of
   (a) a slurry of a solid benzimidazolecarbamate of the formula

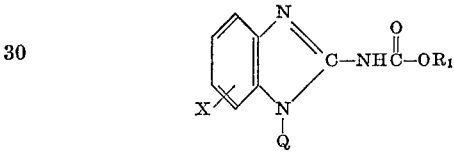

wherein Q, X, $R_1$, $R_2$, $R_3$, $R_4$, Z, D, and E are as defined in claim 1 in a solvent selected from the group consisting of dimethylformamide, acetone or methyl ethyl ketone and a one half molar equivalent of the acetate, chloride, sulfate or nitrate of zinc, manganese, nickel, cobalt, copper, cadmium, iron, or chromium;
   (b) a molar equivalent of aqueous sodium hydroxide, potassium hydroxide, sodium carbonate or potassium carbonate, agitating said system and recovering the resulting complex.

13. The process of claim 12 wherein an aqueous solution of the sulfate of zinc or manganese is used.

References Cited
UNITED STATES PATENTS 2,933,504   4/1960   Klopping _____ 260—299

ALEX MAZEL, Primary Examiner
R. J. GALLAGHER, Assistant Examiner

U.S. Cl. X.R.
260—309.2; 424—245

PO-1050
(5/69)

UNITED STATES PATENT OFFICE
CERTIFICATE OF CORRECTION

Patent No. 3,562,282    Dated February 9, 1971

Inventor(s) Hein L. Klopping

It is certified that error appears in the above-identified patent and that said Letters Patent are hereby corrected as shown below:

In Column 36 of the claims, at line 1 of Claim 9, "Claim 2" should read -- Claim 8 --, and in Claim 12, line 2 between "comprising" and "a" insert -- preparing --.

Signed and sealed this 18th day of May 1971.

(SEAL)
Attest:

EDWARD M. FLETCHER, JR.
Attesting Officer

WILLIAM E. SCHUYLER,
Commissioner of Paten